(12) United States Patent
Offerdahl et al.

(10) Patent No.: US 10,721,861 B2
(45) Date of Patent: Jul. 28, 2020

(54) PRESSURIZED LIQUID CUTTING HARVESTER FOR PRODUCE

(71) Applicant: Taylor Fresh Foods, Inc., Salinas, CA (US)

(72) Inventors: David Offerdahl, Salinas, CA (US); Cayetano Padilla, Salinas, CA (US); Mark Borman, Salinas, CA (US)

(73) Assignee: Taylor Fresh Foods, Inc., Salinas, CA (US)

(*) Notice: Subject to any disclaimer, the term of this patent is extended or adjusted under 35 U.S.C. 154(b) by 295 days.

(21) Appl. No.: 15/912,061

(22) Filed: Mar. 5, 2018

(65) Prior Publication Data

US 2018/0249627 A1 Sep. 6, 2018

Related U.S. Application Data

(60) Provisional application No. 62/467,419, filed on Mar. 6, 2017.

(51) Int. Cl.
| | |
|---|---|
| *A01D 34/01* | (2006.01) |
| *A01D 61/00* | (2006.01) |
| *B26F 3/00* | (2006.01) |
| *A01D 34/08* | (2006.01) |
| *A01D 43/08* | (2006.01) |
| *A01D 43/063* | (2006.01) |

(52) U.S. Cl.
CPC ........... *A01D 34/015* (2013.01); *A01D 34/08* (2013.01); *A01D 61/008* (2013.01); *B26F 3/004* (2013.01); *A01D 43/063* (2013.01); *A01D 43/086* (2013.01)

(58) Field of Classification Search
CPC ...... A01D 34/015; A01D 34/08; A01D 43/14; A01D 45/001; A01D 45/263; A01D 61/008; B26F 3/004

USPC .......... 56/12.7, 16.8, 8, 229, 10.1; 30/123.3; 83/177; 239/159, 170, 436, 443, 550, 239/556, 557
See application file for complete search history.

(56) References Cited

U.S. PATENT DOCUMENTS

| | | | | |
|---|---|---|---|---|
| 4,325,209 A | * | 4/1982 | Cicci | A01D 43/00 56/1 |
| 4,918,909 A | | 4/1990 | Salkeld | |

(Continued)

OTHER PUBLICATIONS

International Search Report issued to PCT/US18/20922 dated May 25, 2018.

*Primary Examiner* — Robert E Pezzuto
(74) *Attorney, Agent, or Firm* — Patterson + Sheridan, LLP

(57) ABSTRACT

Embodiments for implementing a harvester method, system, and apparatus are provided. For example, a harvester for produce may include a fluid knife system at a front end of the harvester in a travel direction of the harvester, wherein the fluid knife system projects a fluid at a pressure and a direction that cuts produce, a roller bar including one or more fingers extending radially outward and configured to receive produce from the fluid knife system, wherein the roller bar rotates on its axis turning the one or more fingers at the front end lifting the produce cut by the fluid knife system, a plurality of conveyers that receive the produce from the roller bar and are configured to transport the produce through the harvester, and a bin system configured to receive the produce from the plurality of conveyers and package the produce into one or more bins.

23 Claims, 40 Drawing Sheets

(56) References Cited

U.S. PATENT DOCUMENTS

| | | | |
|---|---|---|---|
| 6,481,193 B2 * | 11/2002 | Williams | A01D 34/015 56/12.7 |
| 6,484,810 B1 | 11/2002 | Bendix et al. | |
| 6,807,799 B2 | 10/2004 | Reaux | |
| 7,281,364 B2 * | 10/2007 | Maconachy | A01D 45/001 56/16.8 |
| 2009/0077940 A1 | 3/2009 | Maconachy et al. | |
| 2016/0135372 A1 | 5/2016 | Bonte et al. | |

* cited by examiner

PRESSURIZED LIQUID CUTTING HARVESTER FOR PRODUCE

CLAIM OF PRIORITY UNDER 35 U.S.C. § 119

The present Application for Patent claims benefit of U.S. Provisional Patent Application Ser. No. 62/467,419, filed Mar. 6, 2017, assigned to the assignee hereof and hereby expressly incorporated by reference herein.

BACKGROUND

Field of the Disclosure

The present disclosure relates generally to a harvester and more specifically to a produce harvester that incorporates a number of design elements.

Description of the Related Art

Harvesting produce can entail a complex and burdensome process of balancing the need to provide strong enough force to uproot or cut the produce while also providing a controlled and gentle handling of the produce to avoid damage and contamination. Controlled and gentle handling is helpful to implement during all steps of produce processing such as during the steps of inspection, cleaning, and packaging of the produce. Further, the cost and the efficiency of harvesting are other considerations that should be taken into account when designing and implementing harvesting systems and operations.

Currently, cutting of the produce can be done using a number of different devices such as blades, band-saw type cutting implement, and/or water knives. The further handling typically includes a feed conveyer followed by a lift conveyor followed by an inspection conveyer, then a wash station and one or more of a transfer conveyer and an elevator conveyer to move the produce to an exit point of the harvester. However, the current systems do not effectively address all the above considerations.

BRIEF SUMMARY

Exemplary embodiments overcome the above disadvantages and other disadvantages not described above. Also, an exemplary embodiment is not required to overcome the disadvantages described above, and an exemplary embodiment may not overcome any of the issues described above.

According to an aspect of an exemplary embodiment, there is provided a harvester for produce. The harvester includes a fluid knife system configured at a front end of the harvester in a travel direction of the harvester, wherein the fluid knife system projects a fluid using one or more apertures at a pressure and a direction that cuts produce, a roller bar including one or more fingers extending radially outward from the roller bar configured to receive produce from the fluid knife system, wherein the roller bar is adjacent to the fluid knife system and is parallel to ground and perpendicular to the travel direction and rotates on its axis turning the one or more fingers at the front end lifting the produce cut by the fluid knife system, a plurality of conveyers that receive the produce from the roller bar and are configured to transport the produce through the harvester, and a bin system configured to receive the produce from the plurality of conveyers and package the produce into one or more bins.

The fluid knife system may include a liquid source that provides a flow of the fluid to the one or more apertures, and a liquid pump that provides the liquid from the liquid source at a pressure at the one or more apertures. The rotating bar may include a plurality of rods connected between two circular plates along a circumference of the two circular plates forming a cylinder shape, and wherein the plurality of fingers is distributed among the plurality of rods. The plurality of fingers may be provided in a plurality of finger groups that are spaced apart at equal intervals along the rotating bar. The equal intervals may space apart the plurality of fingers offset from the one or more apertures of the liquid knife system in the travel direction of the harvester.

The plurality of conveyers may include a feed conveyer that receives produce from the roller bar and transports the produce along the travel direction, a lift conveyer that receives the produce from the feed conveyer and transports the produce along the travel direction, a trash reduction zone that receives the produce from the lift conveyer and transports the produce along the travel direction, an inspection conveyer that receives the produce from the trash reduction zone and transports the produce perpendicular to the travel direction outward to either side of the harvester, and a trash conveyer that receives trash from the trash reduction zone and the inspection conveyer and transports the trash off the harvester.

The plurality of conveyers may include a subset of conveyers that extend and rotate in a direction perpendicular to the travel direction of the harvester. The plurality of conveyers may include a front-end spray bar including one or more apertures through which a wash solution is sprayed onto passing produce that is being transported by the lift conveyer. The lift conveyer may be a parallel bar lift conveyer that includes a first rotating portion located toward the front end along the travel direction of the harvester, a second rotating portion behind and elevated along the travel direction in relation to the first rotating portion, and a belt that extends around the first rotating portion and the second rotating portion, the belt formed of a plurality of rods extending perpendicular to the travel direction forming the belt, wherein a spacing distance is provided between each of the plurality of rods. The plurality of conveyers may include an air knife positioned over the trash reduction zone, wherein the air knife includes one or more apertures that spray a gas at the produce being transported by the trash reduction zone blowing trash particulate off the produce onto the trash conveyer.

The bin system may include a plurality of bins that includes the one or more bins configured to carry produce, an empty tote conveyer that transports empty bins from the plurality of bins onto the harvester toward the plurality of conveyers, a pack station where the produce is moved from the plurality of conveyers into at least one bin that is empty from the plurality of bins filling the bin, and a full tote conveyer that receives the filled bin and transports the filled bin of the plurality of bins off the harvester.

According to an aspect of another exemplary embodiment, there is provided a harvester. The harvest may include a fluid knife system configured at a front end of the harvester in a travel direction of the harvester, wherein the fluid knife system projects a fluid using one or more apertures at a pressure and a direction that cuts produce, a plurality of conveyers that receive the produce and are configured to transport the produce through the harvester, wherein the plurality of conveyers includes at least, a parallel bar lift conveyer that includes a first rotating portion located toward the front end along the travel direction of the harvester, a second rotating portion behind and elevated along the travel direction in relation to the first rotating portion, and a belt that extends around the first rotating portion and the second rotating portion, the belt formed of a plurality of rods extending perpendicular to the travel direction forming the belt, wherein a spacing distance is provided between each of the plurality of rods, and a bin system configured to receive the produce from the plurality of conveyers and package the produce into one or more bins.

The harvester may further include a spray bar positioned over the parallel bar lift conveyer. The spray bar may include one or more apertures through which a wash solution is sprayed onto passing produce that is being transported by the parallel bar lift conveyer. The plurality of conveyers may include a trash reduction zone and an air knife positioned over the trash reduction zone, wherein the air knife includes one or more apertures that spray a gas at the produce being transported by the trash reduction zone blowing trash particulate off the produce onto a trash conveyer. The harvester may further include a roller bar including one or more fingers extending radially outward from the roller bar configured to receive produce from the fluid knife system, wherein the roller bar is adjacent to the fluid knife system and is parallel to ground and perpendicular to the travel direction and rotates on its axis turning the one or more fingers at the front end lifting the produce cut by the fluid knife system.

According to an aspect of another exemplary embodiment, there is provided a harvester. The harvester may include a fluid knife system configured at a front end of the harvester in a travel direction of the harvester, wherein the fluid knife system projects a fluid using one or more apertures at a pressure and a direction that cuts produce, a plurality of conveyers that receive the produce and are configured to transport the produce through the harvester, the plurality of conveyers including a spray bar positioned over at least one of the plurality of conveyers, the spray bar including one or more apertures through which a wash solution is sprayed onto passing produce that is being transported by the at least one conveyer, and a bin system configured to receive the produce from the plurality of conveyers and package the produce into one or more bins.

The plurality of conveyers may include a parallel bar lift conveyer that includes a first rotating portion located toward the front end along the travel direction of the harvester, a second rotating portion behind and elevated along the travel direction in relation to the first rotating portion, and a belt that extends around the first rotating portion and the second rotating portion, the belt formed of a plurality of rods extending perpendicular to the travel direction forming the belt, wherein a spacing distance is provided between each of the plurality of rods. The plurality of conveyers may include a trash reduction zone and an air knife positioned over the trash reduction zone, wherein the air knife includes one or more apertures that spray a gas at the produce being transported by the trash reduction zone blowing trash particulate off the produce onto a trash conveyer. The harvester may further include a roller bar including one or more fingers extending radially outward from the roller bar configured to receive produce from the fluid knife system, wherein the roller bar is adjacent to the fluid knife system and is parallel to ground and perpendicular to the travel direction and rotates on its axis turning the one or more fingers at the front end lifting the produce cut by the fluid knife system.

According to an aspect of another exemplary embodiment, there is provided a harvester. The harvester may include a fluid knife system configured at a front end of the harvester in a travel direction of the harvester, wherein the fluid knife system projects a fluid using one or more apertures at a pressure and a direction that cuts produce, a plurality of conveyers that receive the produce and are configured to transport the produce through the harvester, the plurality of conveyers including a trash reduction zone and an air knife positioned over the trash reduction zone, wherein the air knife includes one or more apertures that spray a gas at the produce being transported by the trash reduction zone blowing trash particulate off the produce onto a trash conveyer, and a bin system configured to receive the produce from the plurality of conveyers and package the produce into one or more bins.

The plurality of conveyers may include a parallel bar lift conveyer that includes a first rotating portion located toward the front end along the travel direction of the harvester, a second rotating portion behind and elevated along the travel direction in relation to the first rotating portion, and a belt that extends around the first rotating portion and the second rotating portion, the belt formed of a plurality of rods extending perpendicular to the travel direction forming the belt, wherein a spacing distance is provided between each of the plurality of rods. The harvester may further include a roller bar including one or more fingers extending radially outward from the roller bar configured to receive produce from the fluid knife system, wherein the roller bar is adjacent to the fluid knife system and is parallel to ground and perpendicular to the travel direction and rotates on its axis turning the one or more fingers at the front end lifting the produce cut by the fluid knife system.

According to an aspect of another exemplary embodiment, there is provided a method of operating a harvester for produce. The method includes projecting a fluid that cuts produce using a fluid knife system configured at a front end of the harvester in a travel direction of the harvester, wherein the fluid knife system projects the fluid using one or more apertures at a pressure and a direction that cuts the produce, receiving produce from the fluid knife system at a roller bar including one or more fingers extending radially outward from the roller bar, rotating the roller bar on its axis turning the one or more fingers at the front end lifting the produce cut by the fluid knife system back into the harvester, wherein the roller bar is adjacent to the fluid knife system and is parallel to ground and perpendicular to the travel direction, receiving the produce at a plurality of conveyers from the roller bar and transporting the produce using the plurality of conveyers through the harvester, and receiving the produce at a bin system from the plurality of conveyers and packaging the produce into one or more bins using the bin system.

According to an aspect of another exemplary embodiment, there is provided a method of operating a harvester for produce. The method includes projecting a fluid that cuts produce using a fluid knife system configured at a front end of the harvester in a travel direction of the harvester, wherein the fluid knife system projects the fluid using one or more apertures at a pressure and a direction that cuts the produce, receiving the produce at a plurality of conveyers, transporting the produce using the plurality of conveyers through the harvester using at least a parallel bar lift conveyer that includes a first rotating portion located toward the front end along the travel direction of the harvester, a second rotating portion behind and elevated along the travel direction in relation to the first rotating portion, and a belt that extends around the first rotating portion and the second rotating portion, the belt formed of a plurality of rods extending perpendicular to the travel direction forming the belt, wherein a spacing distance is provided between each of the plurality of rods, receiving the produce at a bin system from the plurality of conveyers, and packaging the produce into one or more bins using the bin system.

According to an aspect of another exemplary embodiment, there is provided a method of operating a harvester for produce. The method includes projecting a fluid that cuts produce using a fluid knife system configured at a front end of the harvester in a travel direction of the harvester, wherein the fluid knife system projects the fluid using one or more apertures at a pressure and a direction that cuts the produce, receiving the produce at a plurality of conveyers, transporting the produce using the plurality of conveyers through the harvester, spraying the produce with a wash solution using a spray bar while the produce is being transported using the plurality of conveyers, receiving the produce at a bin system from the plurality of conveyers, and packaging the produce into one or more bins using the bin system.

According to an aspect of another exemplary embodiment, there is provided a method of operating a harvester for produce. The method includes projecting a fluid that cuts produce using a fluid knife system configured at a front end of the harvester in a travel direction of the harvester, wherein the fluid knife system projects the fluid using one or more apertures at a pressure and a direction that cuts the produce, receiving the produce at a plurality of conveyers, transporting the produce using the plurality of conveyers through the harvester, spraying a gas at the produce being transported by a trash reduction zone of the plurality of conveyers that blows trash particulate off the produce onto a trash conveyer, receiving the produce at a bin system from the plurality of conveyers, and packaging the produce into one or more bins using the bin system.

Other aspects and advantages of the invention will be apparent from the following description and the appended claims.

Figure 1:
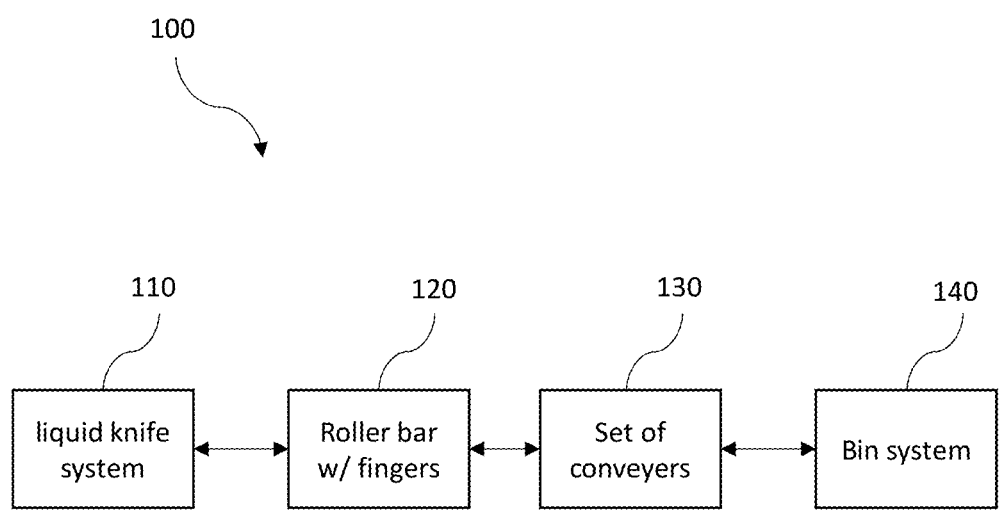
FIG. 1 illustrates a block diagram of a harvester that includes a roller bar with fingers in accordance with one or more embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. The scope is defined not by the detailed description but by the appended claims. Like numerals denote like elements throughout.

Although the terms used herein are generic terms which are currently widely used and are selected by taking into consideration functions thereof, the meanings of the terms may vary according to the intentions of persons skilled in the art, legal precedents, or the emergence of new technologies. Furthermore, some specific terms may be randomly selected by the applicant, in which case the meanings of the terms may be specifically defined in the description of the exemplary embodiment. Thus, the terms should be defined not by simple appellations thereof but based on the meanings thereof and the context of the description of the exemplary embodiment. As used herein, expressions such as "at least one of," when preceding a list of elements, modify the entire list of elements and do not modify the individual elements of the list.

It will be understood that when the terms "includes," "comprises," "including," and/or "comprising," when used in this specification, specify the presence of stated elements and/or components, but do not preclude the presence or addition of one or more elements and/or components thereof. As used herein, the term "module" refers to a unit that can perform at least one function or operation and may be implemented utilizing any form of hardware, software, or a combination thereof.

One or more embodiments of the present disclosure relate generally to a harvester of produce that can include one or more of a number of novel improvements. For example, the harvester can include one or more of a new fluid knife system design, a roller bar, a bin system, a trash reduction zone and air knife, a front-end spray bar, and/or a parallel bar lift conveyer any one of which is novel and provides benefit and advantages over the current state of the art.

According to one or more embodiments, individually mounted nozzles that emit high pressure (HP) liquid to cut produce are attached to a ski, wheel, or sensor that follows the ground. This allows the nozzle assembly to follow the contour next to each plant to maximize the yield of the product by precisely knowing where the cut should be.

According to one or more embodiments, each nozzle has the ability to be adjusted separately by the operator or automatically based on sensor data collected and processed.

Further, according to another embodiment, simultaneously while the product is being cut, the "rotating fingers" push the product onto the "feed conveyor." This conveyor moves the product up to the "lift conveyor." At this transition a "spray bar" is provided to give the product a light rinse. The lift conveyor, which has open sections to allow loose leaves to fall though, inclines the product up to the "inspection conveyor." At this transition an air knife blows the remaining loose leaves down, away from the "trash reduction zone." According to one example, the trash reduction zone may be implementing implemented using a conveyor. Alternatively, in another example, the trash reduction zone may be implemented using another combination of elements. The trash reduction zone takes the product to two "inspection conveyors." The conveyors run in opposite directions, moving the product towards both sides of the harvester where the produce is inspected by workers or by a series of sensors, robotics, and/or other mechatronics.

According to one embodiment, there are 3-4 workers positioned at the two inspection conveyors. These workers take the product, inspect it and then pack it into a tote which can also be called bins, containers, and/or boxes. The empty totes come from the trailer that runs along either side the harvester. When each tote is full, the worker activates a switch to have to tote moved from the "pack station" onto a "full tote conveyor". According to an embodiment. There are two of these conveyors that work together inline. The conveyor takes the full tote to the same trailer running alongside the harvester. These conveyors are bi-directional and can offload the full totes to either side of the harvester. Any product that isn't removed from the inspection conveyor falls onto the "trash conveyor". This product is conveyed to the center of the harvester and falls back onto the ground.

Further, according to one or more embodiments, the areas where the packers stand fold in for transport to keep the harvester compact. This allows a larger working area with a short wheelbase while harvesting that can be folded in for ease of transport.

Turning now to the figures, a number of different embodiments that include one or more novel features are provided herewith.

FIG. 1 illustrates a block diagram of a harvester 100 that includes a roller bar 120 with fingers in accordance with one or more embodiments. The harvester 100 includes a liquid knife system 110, the roller bar 120 with fingers, a set of conveyers 130, and a bin system 140.

According to one or more embodiments, the liquid knife system 110, which may also be called a fluid knife system 110, is configured at a front end of the harvester 100 in a travel direction of the harvester 100. The fluid knife system 110 projects a fluid using one or more apertures at a pressure and a direction that cuts produce that passes between the apertures. The liquid knife system 110 can include a liquid source that provides a flow of the fluid to the one or more apertures. The liquid knife system 110 can further include a liquid pump that provides the liquid from the liquid source at a pressure at the one or more apertures.

According to one or more embodiments, the roller bar 120 with fingers includes one or more fingers extending radially outward from the roller bar 120 configured to receive produce from the fluid knife system 110. The roller bar 120 is adjacent to the fluid knife system 110 and is parallel to ground and perpendicular to the travel direction. Further, the roller bar 120 rotates on its axis turning the one or more fingers upward at the front-end lifting the produce cut by the fluid knife system 110. According to another embodiment, the rotating bar includes a plurality of rods connected between two circular plates along a circumference of the two circular plates forming a cylinder shape. Further, the plurality of fingers is distributed among the plurality of rods. According to another embodiment, the plurality of fingers is provided in a plurality of finger groups that are spaced apart at equal intervals along the rotating bar. According to another embodiment, the equal intervals space apart the plurality of fingers offset from the one or more apertures of the liquid knife system 110 in the travel direction of the harvester 100.

According to one or more embodiments, the set of conveyers 130 receives the produce from the roller bar 120 with fingers and is configured to transport the produce through the harvester 100. According to one or more embodiments, the set of conveyers 130 includes a feed conveyer that receives produce from the roller bar 120 and transports the produce along the travel direction. According to one or more embodiments, the set of conveyers 130 includes a lift conveyer that receives the produce from the feed conveyer and transports the produce along the travel direction. According to one or more embodiments, the set of conveyers 130 includes a trash reduction zone that receives the produce from the lift conveyer and transports the produce along the travel direction. According to one or more embodiments, the set of conveyers 130 includes an inspection conveyer that receives the produce from the trash reduction zone and transports the produce perpendicular to the travel direction outward to either side of the harvester. According to one or more embodiments, the set of conveyers 130 includes a trash conveyer that receives trash from the trash reduction zone and the inspection conveyer and transports the trash off the harvester 100.

Further, according to another embodiment, the plurality of conveyers 130 can further include a front-end spray bar including one or more apertures through which a wash solution is sprayed onto passing produce that is being transported by the lift conveyer.

According to another embodiment, the plurality of conveyers 130 can include a lift conveyer that is a parallel bar lift conveyer. The parallel bar lift conveyer includes a first rotating portion located toward the front end along the travel direction of the harvester, a second rotating portion behind and elevated along the travel direction in relation to the first rotating portion, and a belt that extends around the first rotating portion and the second rotating portion. The belt is formed of a plurality of rods extending perpendicular to the travel direction forming the belt. Further, a spacing distance is provided between each of the plurality of rods.

According to one or more embodiments, the plurality of conveyers 130 can further include an air knife positioned over the trash reduction zone. Further, the air knife can include one or more apertures that spray a gas at the produce being transported by the trash reduction zone blowing trash particulate off the produce onto the trash conveyer.

According to one or more embodiments, the bin system 140 receives the produce from the plurality of conveyers 130 and packages the produce into one or more bins. According to one or more embodiments, the bin system 140 includes a plurality of bins, which can also be called totes, boxes, and/or containers, that includes the one or more bins configured to carry produce. The bin system 140 also includes an empty tote conveyer that transports empty bins from the plurality of bins onto the harvester 100 toward the plurality of conveyers 130. The bin system 140 also includes a pack station where the produce is moved from the plurality of conveyers 130 into at least one bin that is empty from the plurality of bins filling the bin. Further, the bin system 140 includes a full tote conveyer that receives the filled bin and transports the filled bin of the plurality of bins off the harvester.

Figure 2:
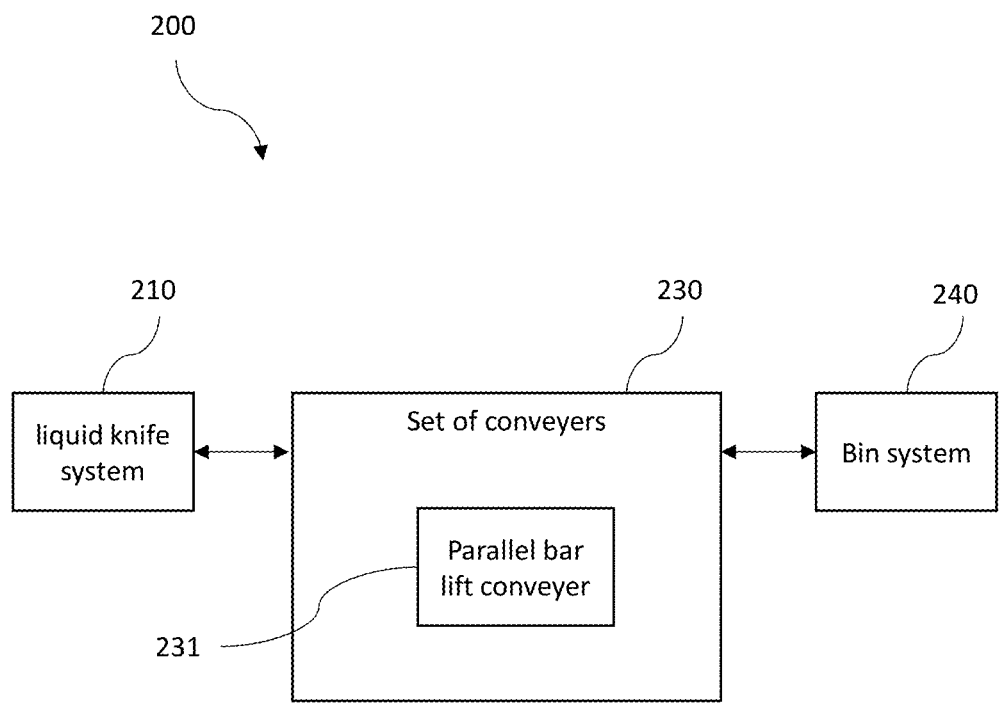
FIG. 2 illustrates a block diagram of a harvester with a parallel bar lift conveyer in accordance with one or more embodiments.

FIG. 2 illustrates a block diagram of a harvester 200 with a parallel bar lift conveyer 231 in accordance with one or more embodiments. As shown, the harvester 200 includes a liquid knife system 210, a set of conveyers 230, and a bin system 240.

According to one or more embodiments, the liquid knife system 210 is configured at a front end of the harvester 200 in a travel direction of the harvester 200. The fluid knife system 210 projects a fluid using one or more apertures at a pressure and a direction that cuts produce that passes between the apertures. The liquid knife system 210 can include a liquid source that provides a flow of the fluid to the one or more apertures. The liquid knife system 210 can further include a liquid pump that provides the liquid from the liquid source at a pressure at the one or more apertures.

According to one or more embodiments, the set of conveyers 230 receives the produce and transports the produce through the harvester 200. According to one or more embodiments, the set of conveyers 230 includes a feed conveyer that receives produce from the roller bar and transports the produce along the travel direction. According to one or more embodiments, the set of conveyers 230 includes a lift conveyer that receives the produce from the feed conveyer and transports the produce along the travel direction. According to one or more embodiments, the set of conveyers 230 includes a trash reduction zone that receives the produce from the lift conveyer and transports the produce along the travel direction. According to one or more embodiments, the set of conveyers 230 includes an inspection conveyer that receives the produce from the trash reduction zone and transports the produce perpendicular to the travel direction outward to either side of the harvester. According to one or more embodiments, the set of conveyers 230 includes a trash conveyer that receives trash from the trash reduction zone and the inspection conveyer and transports the trash off the harvester 200.

According to one or more embodiments, the bin system 240 receives the produce from the plurality of conveyers 230 and packages the produce into one or more bins. According to one or more embodiments, the bin system 240 includes a plurality of bins, which can also be called totes, boxes, and/or containers, that includes the one or more bins configured to carry produce. The bin system 240 also includes an empty tote conveyer that transports empty bins from the plurality of bins onto the harvester 200 toward the plurality of conveyers 230. The bin system 240 also includes a pack station where the produce is moved from the plurality of conveyers 230 into at least one bin that is empty from the plurality of bins filling the bin. Further, the bin system 240 includes a full tote conveyer that receives the filled bin and transports the filled bin of the plurality of bins off the harvester 200.

The set of conveyers can further include a parallel bar lift conveyer 231 which is a specific design of a lift conveyer. The parallel bar lift conveyer 231 includes a first rotating portion located toward the front end along the travel direction of the harvester. The parallel bar lift conveyer 231 also includes a second rotating portion behind and elevated along the travel direction in relation to the first rotating portion. Further, the parallel bar lift conveyer 231 includes a belt that extends around the first rotating portion and the second rotating portion. The belt is formed of a plurality of rods extending perpendicular to the travel direction forming the belt. According to an embodiment, a spacing distance is provided between each of the plurality of rods.

Figure 3:
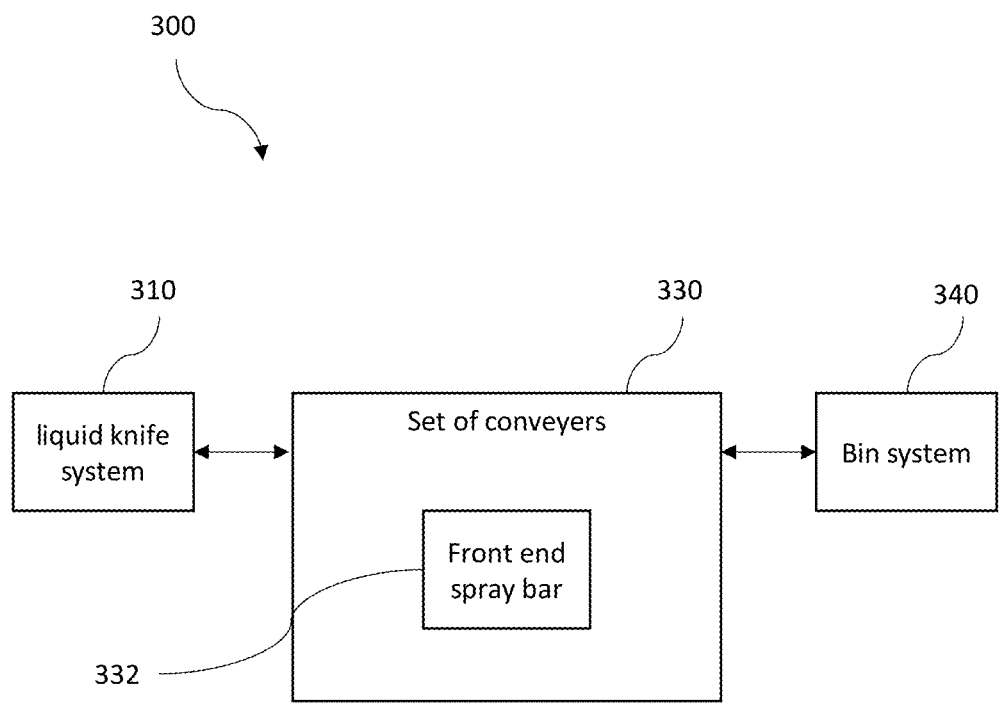
FIG. 3 illustrates a block diagram of a harvester with a front-end spray bar in accordance with one or more embodiments.

FIG. 3 illustrates a block diagram of a harvester 300 with a front-end spray bar 332 in accordance with one or more embodiments. The harvester 300 includes a liquid knife system 310, a set of conveyers 330, and a bin system 340.

According to one or more embodiments, the liquid knife system 310 is configured at a front end of the harvester 300 in a travel direction of the harvester 300. The fluid knife system 310 projects a fluid using one or more apertures at a pressure and a direction that cuts produce that passes between the apertures. The liquid knife system 310 can include a liquid source that provides a flow of the fluid to the one or more apertures. The liquid knife system 310 can further include a liquid pump that provides the liquid from the liquid source at a pressure at the one or more apertures.

According to one or more embodiments, the set of conveyers 330 receives the produce and transports the produce through the harvester 300. According to one or more embodiments, the set of conveyers 330 includes a feed conveyer that receives produce from the roller bar and transports the produce along the travel direction. According to one or more embodiments, the set of conveyers 330 includes a lift conveyer that receives the produce from the feed conveyer and transports the produce along the travel direction. According to one or more embodiments, the set of conveyers 330 includes a trash reduction zone that receives the produce from the lift conveyer and transports the produce along the travel direction. According to one or more embodiments, the set of conveyers 330 includes an inspection conveyer that receives the produce from the trash reduction zone and transports the produce perpendicular to the travel direction outward to either side of the harvester. According to one or more embodiments, the set of conveyers 330 includes a trash conveyer that receives trash from the trash reduction zone and the inspection conveyer and transports the trash off the harvester 300.

According to one or more embodiments, the bin system 340 receives the produce from the plurality of conveyers 330 and packages the produce into one or more bins. According to one or more embodiments, the bin system 340 includes a plurality of bins, which can also be called totes, boxes, and/or containers, that includes the one or more bins configured to carry produce. The bin system 340 also includes an empty tote conveyer that transports empty bins from the plurality of bins onto the harvester 300 toward the plurality of conveyers 330. The bin system 340 also includes a pack station where the produce is moved from the plurality of conveyers 330 into at least one bin that is empty from the plurality of bins filling the bin. Further, the bin system 340 includes a full tote conveyer that receives the filled bin and transports the filled bin of the plurality of bins off the harvester 300.

According to one or more embodiments, the set of conveyers 330 includes the front-end spray bar 332. According to one or more embodiments, the plurality of conveyers 330 receives the produce and is configured to transport the produce through the harvester. Further, the plurality of conveyers 330 include the front-end spray bar 332 positioned over at least one of the plurality of conveyers 330, the front-end spray bar 332 comprising one or more apertures through which a wash solution is sprayed onto passing produce that is being transported by the at least one conveyer.

According to one or more embodiments, the set of conveyers 330 includes a parallel bar lift conveyer that includes a first rotating portion located toward the front end along the travel direction of the harvester and a second rotating portion behind and elevated along the travel direction in relation to the first rotating portion. The parallel bar lift conveyer also includes a belt that extends around the first rotating portion and the second rotating portion, the belt formed of a plurality of rods extending perpendicular to the travel direction forming the belt, wherein a spacing distance is provided between each of the plurality of rods. The front-end spray bar 332 is positioned over the parallel bar lift conveyer of the set of conveyers 330 in accordance with one or more embodiments. Further, the front-end spray bar 332 includes one or more apertures through which a wash solution is sprayed onto passing produce that is being transported by the parallel bar lift conveyer.

Figure 4:
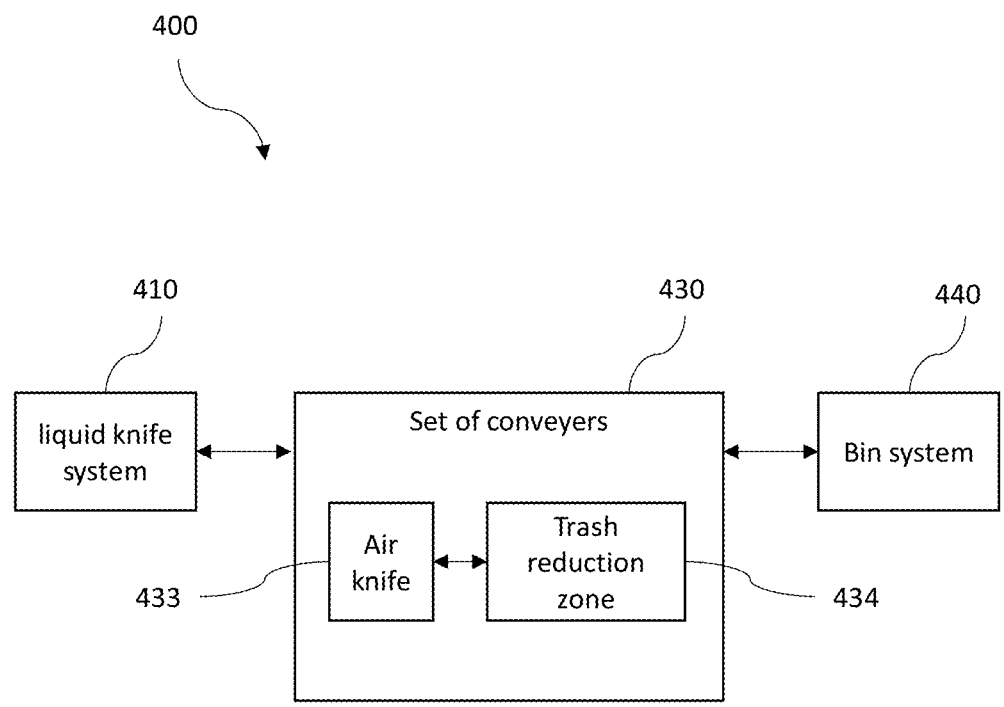
FIG. 4 illustrates a block diagram of a harvester with an air knife and a trash reduction zone in accordance with one or more embodiments.

FIG. 4 illustrates a block diagram of a harvester 400 with an air knife 433 and a trash reduction zone 434 in accordance with one or more embodiments. The harvester 400 includes a liquid knife system 410, a set of conveyers 430, and a bin system 440.

According to one or more embodiments, the liquid knife system 410 is configured at a front end of the harvester 400 in a travel direction of the harvester 400. The fluid knife system 410 projects a fluid using one or more apertures at a pressure and a direction that cuts produce that passes between the apertures. The liquid knife system 410 can include a liquid source that provides a flow of the fluid to the one or more apertures. The liquid knife system 410 can further include a liquid pump that provides the liquid from the liquid source at a pressure at the one or more apertures.

According to one or more embodiments, the set of conveyers 430 receives the produce and transports the produce through the harvester 400. According to one or more embodiments, the set of conveyers 430 includes a feed conveyer that receives produce from the roller bar and transports the produce along the travel direction. According to one or more embodiments, the set of conveyers 430 includes a lift conveyer that receives the produce from the feed conveyer and transports the produce along the travel direction.

According to one or more embodiments, the set of conveyers 430 includes a trash reduction zone 434 that receives the produce from the lift conveyer and transports the produce along the travel direction. According to one or more embodiments, the set of conveyers 430 includes an inspection conveyer that receives the produce from the trash reduction zone and transports the produce perpendicular to the travel direction outward to either side of the harvester. According to one or more embodiments, the set of conveyers 430 includes a trash conveyer that receives trash from the trash reduction zone and the inspection conveyer and transports the trash off the harvester 400.

According to one or more embodiments, the bin system 440 receives the produce from the plurality of conveyers 430 and packages the produce into one or more bins. According to one or more embodiments, the bin system 440 includes a plurality of bins, which can also be called totes, boxes, and/or containers, that includes the one or more bins configured to carry produce. The bin system 440 also includes an empty tote conveyer that transports empty bins from the plurality of bins onto the harvester 400 toward the plurality of conveyers 430. The bin system 440 also includes a pack station where the produce is moved from the plurality of conveyers 430 into at least one bin that is empty from the plurality of bins filling the bin. Further, the bin system 440 includes a full tote conveyer that receives the filled bin and transports the filled bin of the plurality of bins off the harvester 400.

Further, according to one or more embodiments, the harvester 400 can further include an air knife 433 positioned over the trash reduction zone 434. The air knife 433 includes one or more apertures that spray a gas at the produce being transported by the trash reduction zone 434 blowing trash particulate off the produce onto the trash conveyer. The trash particulate can include broken off leaves, dirt, bugs, and other undesirable particulates.

Figure 5:
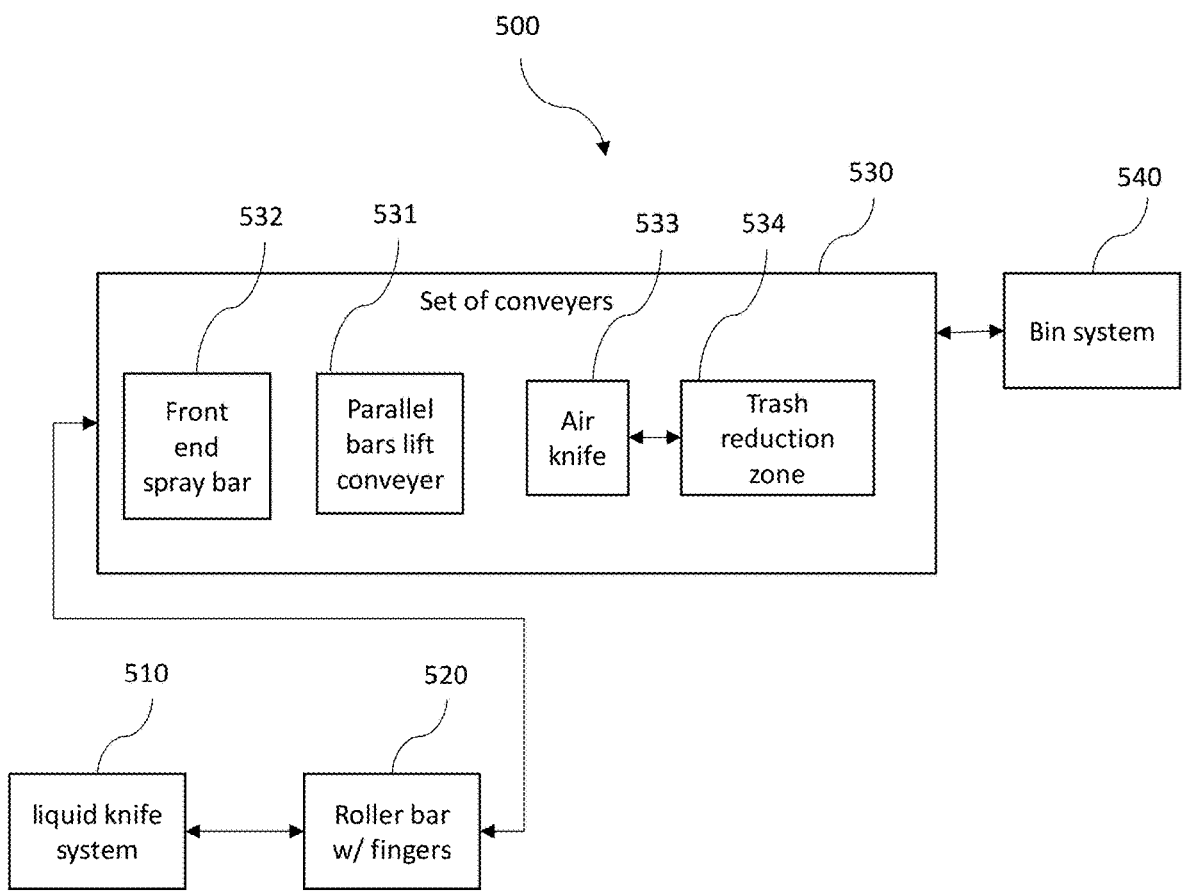
FIG. 5 illustrates a block diagram of a harvester including a plurality of features in accordance with one or more embodiments.

FIG. 5 illustrates a block diagram of a harvester 500 including a plurality of features in accordance with one or more embodiments. Specifically, the harvester includes a liquid knife system 510, a roller bar with fingers 520, a set of conveyers 530, and a bin system 540.

According to one or more embodiments, the liquid knife system 110 is configured at a front end of the harvester 100 in a travel direction of the harvester 100. The fluid knife system 110 projects a fluid using one or more apertures at a pressure and a direction that cuts produce that passes between the apertures. The liquid knife system 110 can include a liquid source that provides a flow of the fluid to the one or more apertures. The liquid knife system 110 can further include a liquid pump that provides the liquid from the liquid source at a pressure at the one or more apertures.

According to one or more embodiments, the roller bar with fingers 520 includes one or more fingers extending radially outward from the roller bar configured to receive produce from the fluid knife system 510. The roller bar is adjacent to the fluid knife system 510 and is parallel to ground and perpendicular to the travel direction. Further, the roller bar rotates on its axis turning the one or more fingers upward at the front-end lifting the produce cut by the fluid knife system 510. According to another embodiment, the rotating bar includes a plurality of rods connected between two circular plates along a circumference of the two circular plates forming a cylinder shape. Further, the plurality of fingers is distributed among the plurality of rods. According to another embodiment, the plurality of fingers is provided in a plurality of finger groups that are spaced apart at equal intervals along the rotating bar. According to another embodiment, the equal intervals space apart the plurality of fingers offset from the one or more apertures of the liquid knife system 510 in the travel direction of the harvester 500.

According to one or more embodiments, the set of conveyers 530 receives the produce from the roller bar with fingers 520 and transports the produce through the harvester 500. According to one or more embodiments, the set of conveyers 530 includes a feed conveyer that receives produce from the roller bar and transports the produce along the travel direction. According to one or more embodiments, the set of conveyers 530 includes a lift conveyer that receives the produce from the feed conveyer and transports the produce along the travel direction. According to one or more embodiments, the set of conveyers 530 includes a trash reduction zone 534 that receives the produce from the lift conveyer and transports the produce along the travel direction. According to one or more embodiments, the set of conveyers 530 includes an inspection conveyer that receives the produce from the trash reduction zone and transports the produce perpendicular to the travel direction outward to either side of the harvester. According to one or more embodiments, the set of conveyers 530 includes a trash conveyer that receives trash from the trash reduction zone and the inspection conveyer and transports the trash off the harvester.

The set of conveyers can further include a parallel bar lift conveyer 531 which is a specific design of a lift conveyer. The parallel bar lift conveyer 531 includes a first rotating portion located toward the front end along the travel direction of the harvester. The parallel bar lift conveyer 531 also includes a second rotating portion behind and elevated along the travel direction in relation to the first rotating portion. Further, the parallel bar lift conveyer 531 includes a belt that extends around the first rotating portion and the second rotating portion. The belt is formed of a plurality of rods extending perpendicular to the travel direction forming the belt. According to an embodiment, a spacing distance is provided between each of the plurality of rods.

According to one or more embodiments, the set of conveyers 530 includes a front-end spray bar 532. According to one or more embodiments, the plurality of conveyers 530 receives the produce and is configured to transport the produce through the harvester. Further, the plurality of conveyers 530 includes the front-end spray bar 532 positioned over at least one of the plurality of conveyers 530, and the front-end spray bar 532 includes one or more apertures through which a wash solution is sprayed onto passing produce that is being transported by the at least one conveyer.

According to another embodiment, the front-end spray bar 532 is positioned over the parallel bar lift conveyer 531 of the set of conveyers 530 in accordance with one or more embodiments. Further, the front-end spray bar 532 includes one or more apertures through which a wash solution is sprayed onto passing produce that is being transported by the parallel bar lift conveyer 531.

According to one or more embodiments, the set of conveyers 530 further includes a trash reduction zone 534 that receives the produce from the lift conveyer and transports the produce along the travel direction. According to one or more embodiments, the set of conveyers 530 includes an inspection conveyer that receives the produce from the trash reduction zone and transports the produce perpendicular to the travel direction outward to either side of the harvester. According to one or more embodiments, the set of conveyers 530 includes a trash conveyer that receives trash from the trash reduction zone 534 and the inspection conveyer and transports the trash off the harvester 500.

Further, the harvester 500 can further include an air knife 533 positioned over the trash reduction zone 534. The air knife 533 includes one or more apertures that spray a gas at the produce being transported by the trash reduction zone 534 blowing trash particulate off the produce onto the trash conveyer. The trash particulate can include broken off leaves, dirt, bugs, and other undesirable particulates.

According to one or more embodiments, the bin system 540 receives the produce from the plurality of conveyers 530 and packages the produce into one or more bins. According to one or more embodiments, the bin system 540 includes a plurality of bins, which can also be called totes, boxes, and/or containers, that includes the one or more bins configured to carry produce. The bin system 540 also includes an empty tote conveyer that transports empty bins from the plurality of bins onto the harvester 500 toward the plurality of conveyers 530. The bin system 540 also includes a pack station where the produce is moved from the plurality of conveyers 530 into at least one bin that is empty from the plurality of bins filling the bin. Further, the bin system 540 includes a full tote conveyer that receives the filled bin and transports the filled bin of the plurality of bins off the harvester.

Figure 6A:
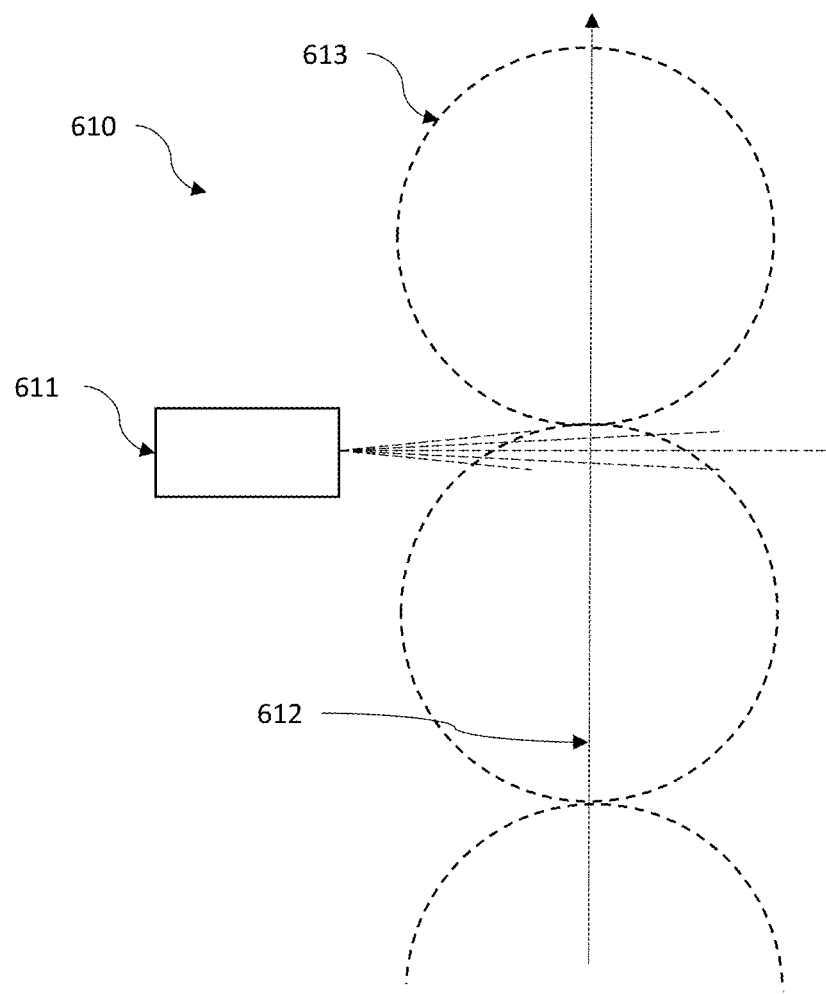
FIG. 6A-6B illustrate a top view a basic aperture arrangement of a fluid knife system in accordance with one or more embodiments.

FIG. 6A illustrates a top view a basic aperture arrangement of a fluid knife system 610 in accordance with one or more embodiments. The fluid knife system 610 includes an aperture 611. According to one or more embodiments the aperture 611 can be a nozzle. Also, shown in the figure is a travel direction 612 of the harvester. Further, for illustrative purposes, produce 613 are shown that are arranged in a row along the travel direction 612. Further, as shown, the aperture 611 sprays a fluid toward the produce 613 that passes through the fluid stream along the travel direction 613. As the produce 613 comes into contact with the fluid stream, the fluid stream is provided with sufficient force and flow so as to cut the produce 613 thereby harvesting the produce 613.

Figure 6B:
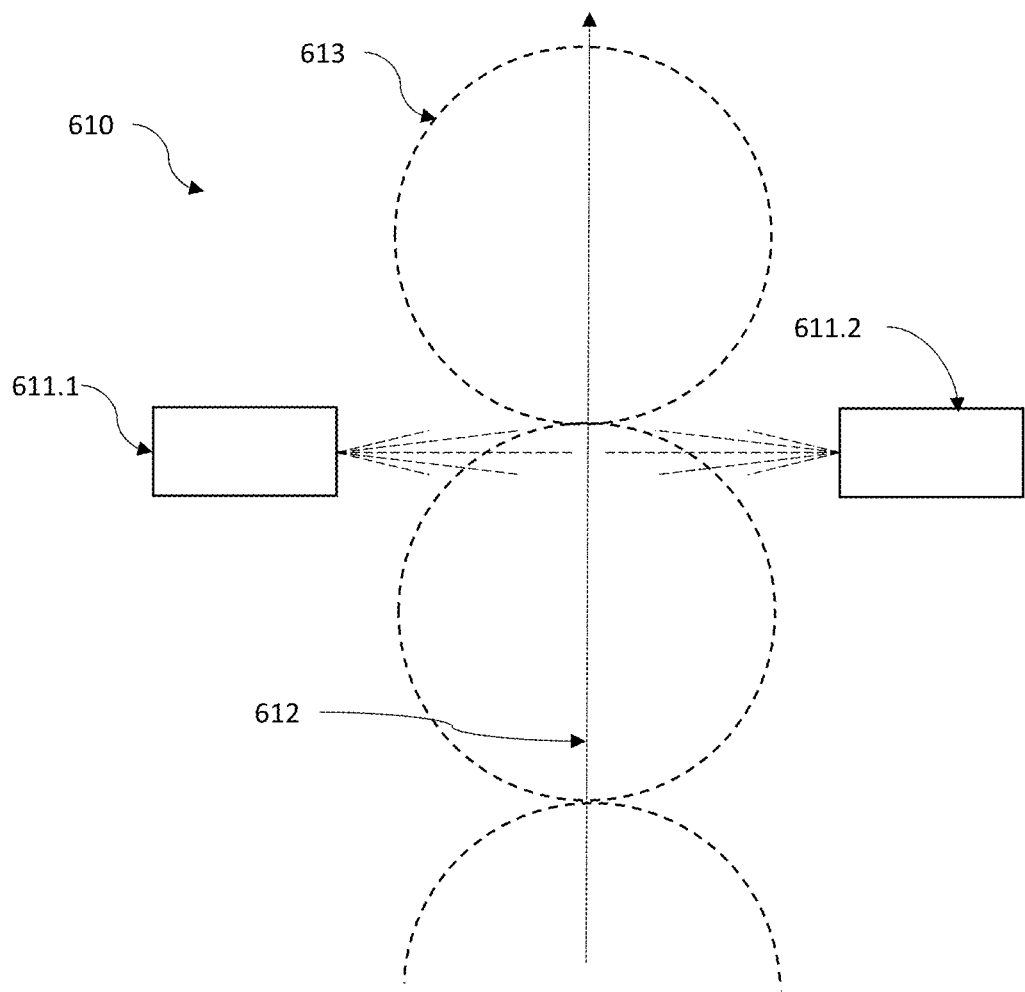

FIG. 6B illustrates a top view of a basic aperture arrangement of a fluid knife system 610 in accordance with one or more embodiments. The fluid knife system 610 includes a first aperture 611.1 and a second aperture 611.2. According to one or more embodiments the first and second apertures can be nozzles. Also, shown in the figure is a travel direction 612 of the harvester. Further, for illustrative purposes, produce 613 are shown that are arranged in a row along the travel direction 612. Further, as shown, the first and second apertures 611.1 and 611.2 spray a fluid toward each other as the produce 613 passes between the fluid streams along the travel direction 613. As the produce 613 comes into contact with the fluid streams, the fluid streams are provided with sufficient force and flow so as to cut the produce 613 thereby harvesting the produce 613.

Figure 7:
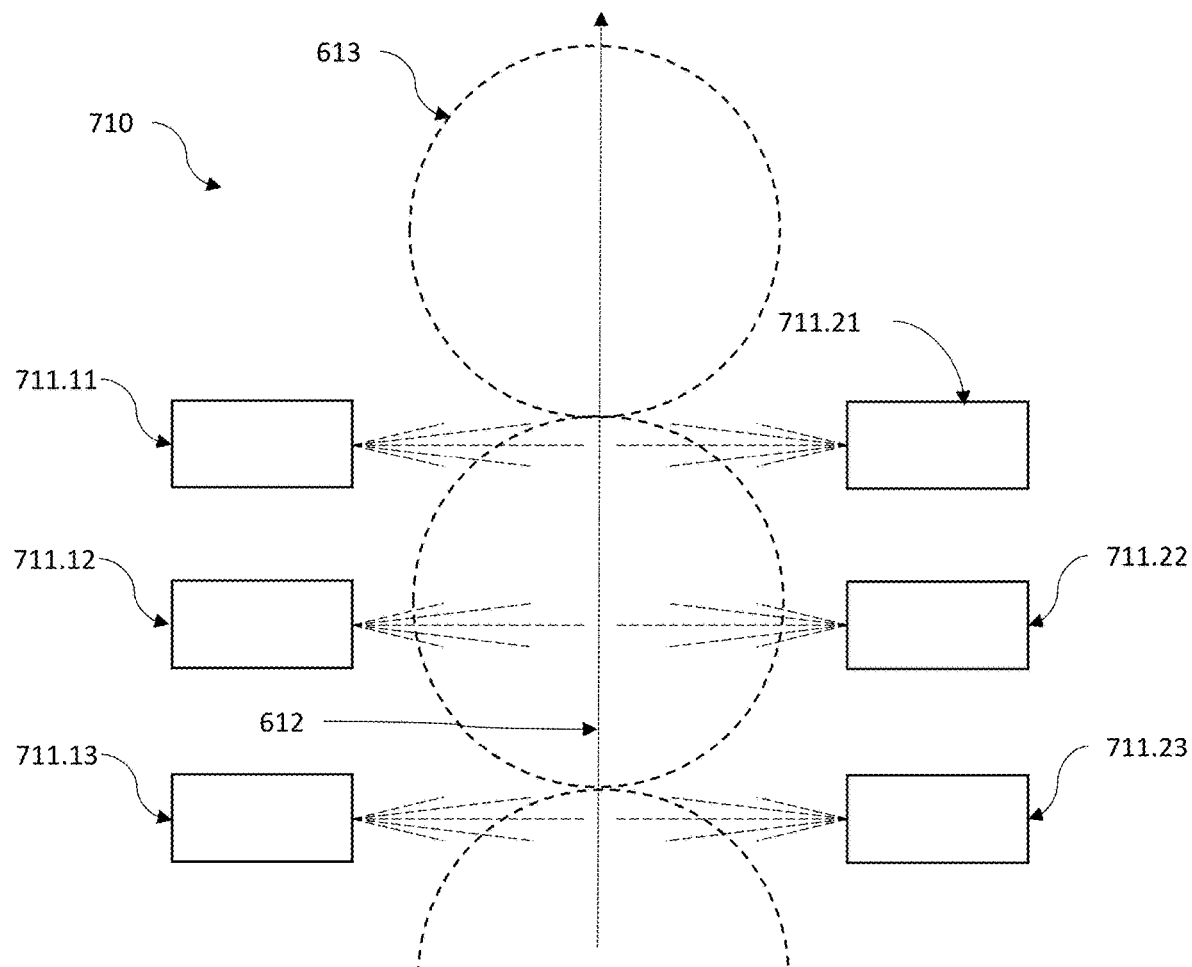
FIG. 7 illustrates a top view a redundant aperture arrangement of a fluid knife system in accordance with one or more embodiments.

FIG. 7 illustrates a top view of a redundant aperture arrangement of a fluid knife system 710 in accordance with one or more embodiments. The fluid knife system 710 includes a first plurality of apertures 711.11, 711.12, and 711.13 and a second plurality of apertures 711.21, 711.22, and 711.23. According to one or more embodiments the first and second plurality of apertures can be nozzles. Also, shown in the figure is a travel direction 612 of the harvester. Further, for illustrative purposes, produce 613 are shown that are arranged in a row along the travel direction 612. Further, as shown, the first and second plurality of apertures 711.11-711.13 and 711.21-711.23 spray a fluid toward each other as the produce 613 passes between the fluid streams along the travel direction 613. As the produce 613 comes into contact with each fluid streams, the fluid streams are provided with sufficient force and flow so as to incrementally cut the produce 613 thereby harvesting the produce 613 once the produce passes through all the fluid streams.

Figure 8:
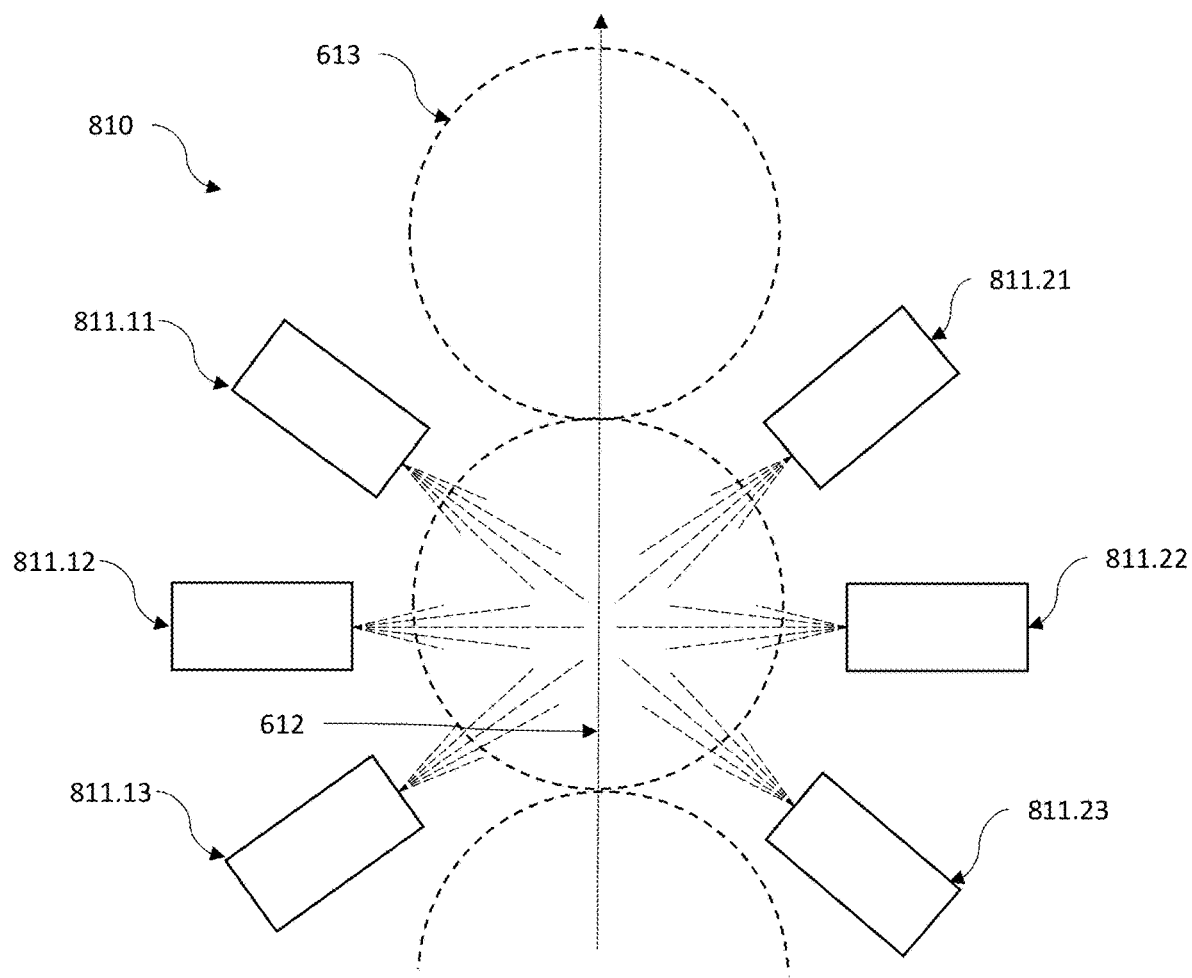
FIG. 8 illustrates a top view a focused aperture arrangement of a fluid knife system in accordance with one or more embodiments.

FIG. 8 illustrates a top view of a focused aperture arrangement of a fluid knife system 810 in accordance with one or more embodiments. The fluid knife system 810 includes a first plurality of apertures 811.11, 811.12, and 811.13 which are arranged so that the fluid streaming created are focused at a specific cutting point. The fluid knife system 810 also includes a second plurality of apertures 811.21, 811.22, and 811.23 that are also arranged toward the same specific cutting point. According to one or more embodiments the first and second plurality of apertures can be nozzles. Also, shown in the figure is a travel direction 612 of the harvester. Further, for illustrative purposes, produce 613 are shown that are arranged in a row along the travel direction 612. Further, as shown, the first and second plurality of apertures 811.11-811.13 and 811.21-811.23 spray a fluid toward each other, and more specifically toward the same specific cutting point, as the produce 613 passes between the fluid streams along the travel direction 613. As the produce 613 comes into contact with each the fluid streams at the specific cutting point, the fluid streams are provided with sufficient force and flow so as to together cut the produce 613 thereby harvesting the produce 613 as the produce simultaneously passes through all the fluid streams.

Figure 9:
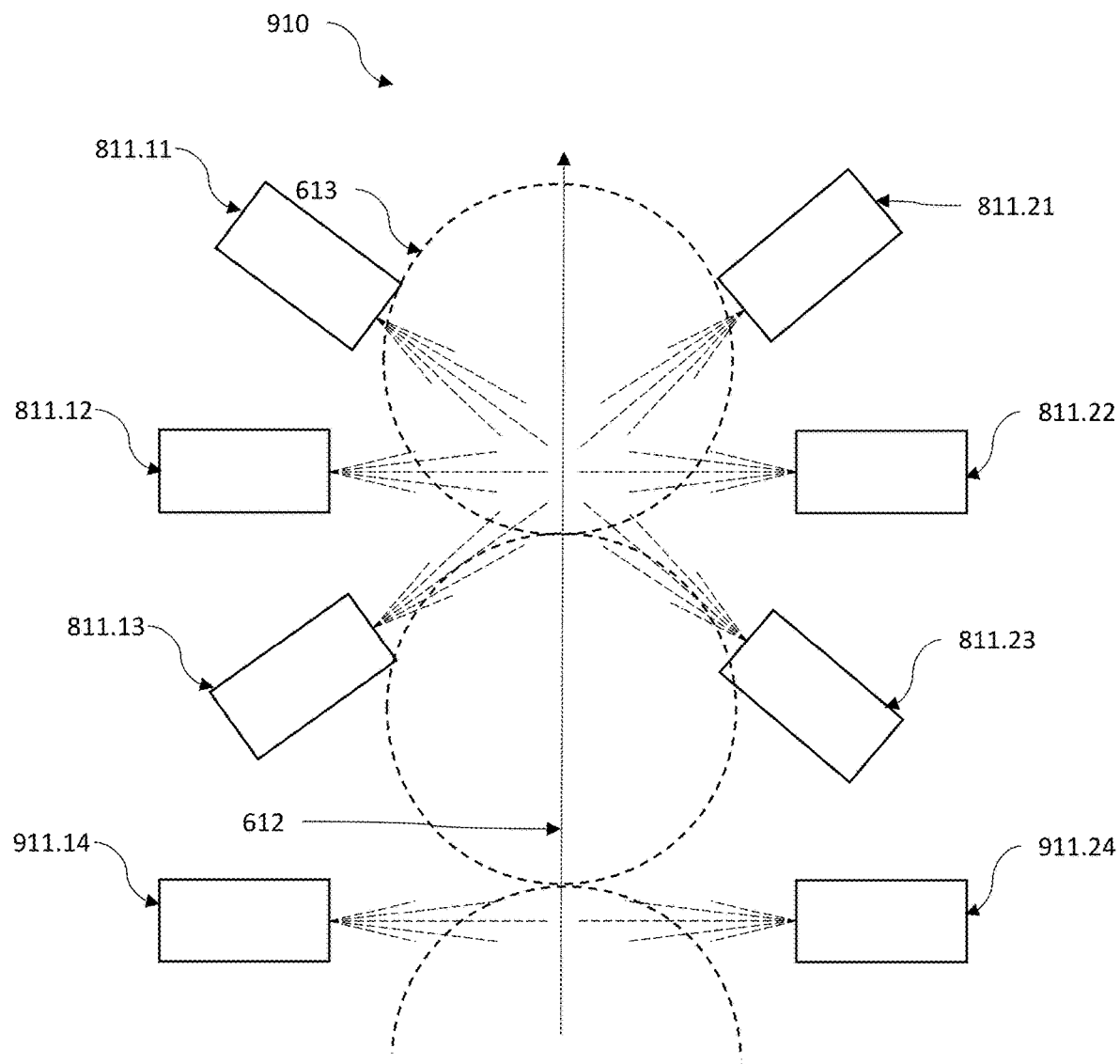
FIG. 9 illustrates a top view a focused and prewash aperture arrangement of a fluid knife system in accordance with one or more embodiments.

FIG. 9 illustrates a top view of a focused and prewash aperture arrangement of a fluid knife system 910 in accordance with one or more embodiments. The fluid knife system 910 includes a first plurality of apertures 811.11, 811.12, and 811.13 which are arranged so that the fluid streaming created are focused at a specific cutting point. The fluid knife system 910 also includes a second plurality of apertures 811.21, 811.22, and 811.23 that are also arranged toward the same specific cutting point. According to one or more embodiments the first and second plurality of apertures can be nozzles. Also, shown in the figure is a travel direction 612 of the harvester. Further, for illustrative purposes, produce 613 are shown that are arranged in a row along the travel direction 612. Further, as shown, the first and second plurality of apertures 811.11-811.13 and 811.21-811.23 spray a fluid toward each other, and more specifically toward the same specific cutting point, as the produce 613 passes between the fluid streams along the travel direction 613. As the produce 613 comes into contact with each the fluid streams at the specific cutting point, the fluid streams are provided with sufficient force and flow so as to together cut the produce 613 thereby harvesting the produce 613 as the produce simultaneously passes through all the fluid streams.

Further, the fluid knife system 910 also includes a first prewash aperture 911.14 and a second prewash aperture 911.24. The first prewash aperture 911.14 and the second prewash aperture 911.24 can spray a fluid toward each other as shown before the produce 613 reaches the specific cutting point. The first prewash aperture 911.14 and the second prewash aperture 911.24 can spray the produce 613 such that any residue, such as chemical residue, dirt, and/or other surface particulates can be removed. According to another embodiment, the first prewash aperture 911.14 and the second prewash aperture 911.24 can apply a wash treatment to the produce that kills microbial organisms which is then washed off by the first and second plurality of apertures 811.11-811.13 and 811.21-811.23. Further, according to another embodiment, the first prewash aperture 911.14 and the second prewash aperture 911.24 can be arranged to spray a different portion of the produce 613 as compared to the other apertures and can apply a protective wash treatment to the produce 613.

Figure 10:
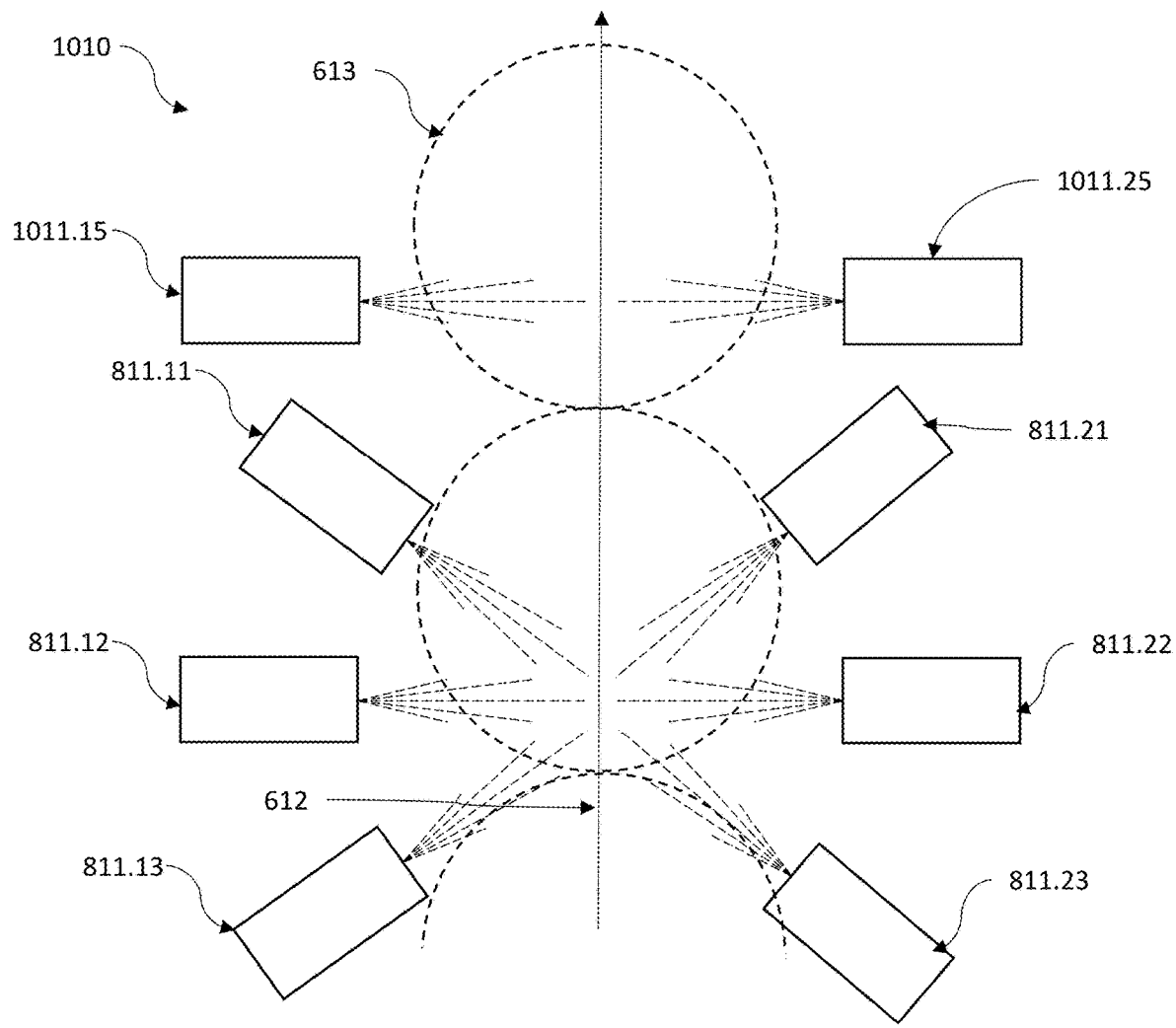
FIG. 10 illustrates a top view a focused and post-wash aperture arrangement of a fluid knife system in accordance with one or more embodiments.

FIG. 10 illustrates a top view of a focused and post-wash aperture arrangement of a fluid knife system 1010 in accordance with one or more embodiments. The fluid knife system 1010 includes a first plurality of apertures 811.11, 811.12, and 811.13 which are arranged so that the fluid streaming created are focused at a specific cutting point. The fluid knife system 1010 also includes a second plurality of apertures 811.21, 811.22, and 811.23 that are also arranged toward the same specific cutting point. According to one or more embodiments the first and second plurality of apertures can be nozzles. Also, shown in the figure is a travel direction 612 of the harvester. Further, for illustrative purposes, produce 613 are shown that are arranged in a row along the travel direction 612. Further, as shown, the first and second plurality of apertures 811.11-811.13 and 811.21-811.23 spray a fluid toward each other, and more specifically toward the same specific cutting point, as the produce 613 passes between the fluid streams along the travel direction 613. As the produce 613 comes into contact with each the fluid streams at the specific cutting point, the fluid streams are provided with sufficient force and flow so as to together cut the produce 613 thereby harvesting the produce 613 as the produce simultaneously passes through all the fluid streams.

Further, the fluid knife system 1010 also includes a first post-wash aperture 1011.15 and a second post-wash aperture 1011.24. The first post-wash aperture 1011.14 and the second post-wash aperture 1011.24 can spray a fluid toward each other as shown after the produce 613 reaches the specific cutting point. The first post-wash aperture 1011.14 and the post-wash aperture 1011.24 can spray the produce 613 such that any residue, such as chemical residue, dirt, and/or other surface particulates can be removed that may have attached during the cutting portion. According to another embodiment, the first post-wash aperture 1011.14 and the second post-wash aperture 1011.24 can apply a wash treatment to the produce that kills microbial organisms. Further, according to another embodiment, the first post-wash aperture 1011.14 and the second post-wash aperture 1011.24 can be arranged to spray the produce 613 with a protective wash treatment to protect the produce 613.

Figure 11:
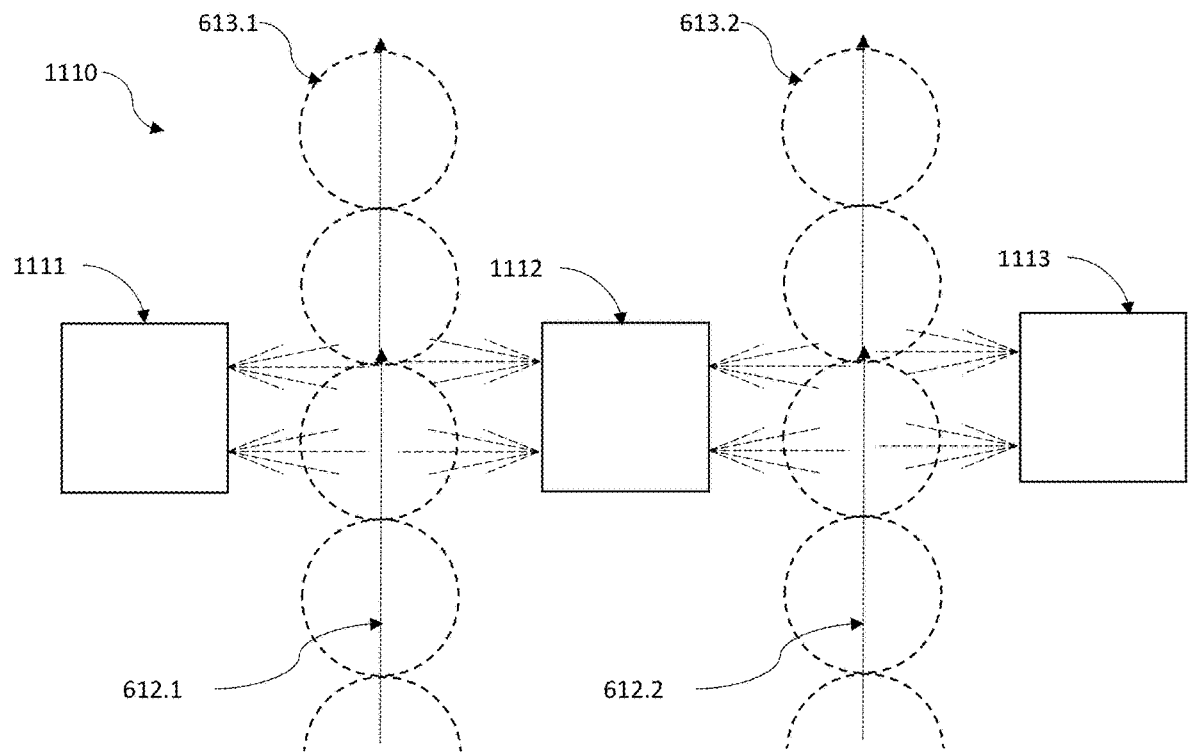
FIG. 11 illustrates a top view a multiple row and redundant aperture arrangement of a fluid knife system in accordance with one or more embodiments.

FIG. 11 illustrates a top view of a multiple row 612.1 and 612.2 redundant aperture arrangement of a fluid knife system 1110 in accordance with one or more embodiments. The fluid knife system 1110 includes a first aperture device 1111, a second aperture device 1112, and a third aperture device 1113. The first aperture device 1111, second aperture device 1112, and third aperture device 1113 can each include a plurality of aperture opening out of which a fluid can be sprayed at produce 613.1 and 613.2. According to one or more embodiments, any one of the apertures can be implemented using one or more nozzles.

Specifically, as shown the first aperture device 1111 can include two apertures that spray fluid toward the produce 613.1. Further, the third aperture device 1113 can include two apertures that spray fluid toward the produce 613.2. Additionally, the second aperture device 1112 is positioned between the first aperture device 1111 and the third aperture device 1113 as shown. The second aperture device 1112 can be provided with a set of apertures on both sides that spray fluid toward each of the first and second aperture devices 1111 and 1112. Accordingly, as the produce 613.1 and 613.2 comes into contact with each fluid streams, the fluid streams are provided with sufficient force and flow so as to incrementally cut the produce 613.1 and 613.2 thereby harvesting the produce 613.1 and 613.2 once the produce passes through all the fluid streams. Accordingly, as shown two rows of produce can be harvested at the same time. This embodiment can be scaled up to support a plurality of rows well in excess of two in accordance with a plurality of different embodiments.

Figure 12:
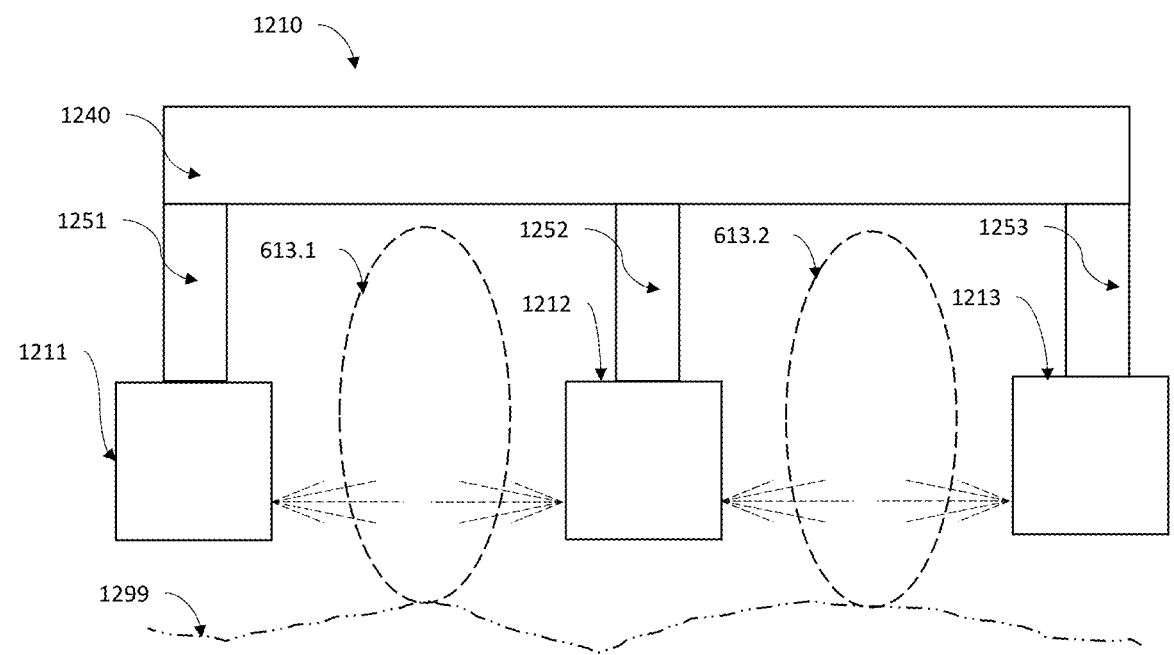
FIG. 12 illustrates a front view a basic aperture arrangement of a fluid knife system in accordance with one or more embodiments.

FIG. 12 illustrates a front view of a basic aperture arrangement of a fluid knife system 1210 in accordance with one or more embodiments. The fluid knife system 1210 includes a first aperture device 1211, a second aperture device 1212, and a third aperture device 1213. The first aperture device 1211, second aperture device 1212, and third aperture device 1213 can each include a plurality of aperture openings from which a fluid can be sprayed at produce 613.1 and 613.2. According to one or more embodiments, any one of the apertures can be implemented using one or more nozzles.

Specifically, as shown the first aperture device 1211 can include an aperture that sprays fluid toward the produce 613.1. Further, the third aperture device 1213 can include an aperture that sprays fluid toward the produce 613.2. Additionally, the second aperture device 1212 is positioned between the first aperture device 1211 and the third aperture device 1213 as shown. The second aperture device 1212 can be provided with apertures on both sides that spray fluid toward each of the first and second aperture devices 1211 and 1212. Accordingly, as the produce 613.1 and 613.2 comes into contact with each fluid streams, the fluid streams are provided with sufficient force and flow so as to cut the produce 613.1 and 613.2 thereby harvesting the produce 613.1 and 613.2 once the produce passes through all the fluid streams. Accordingly, as shown two rows of produce can be harvested at the same time. This embodiment can be scaled up to support a plurality of rows well in excess of two in accordance with a plurality of different embodiments.

Further, as shown, the first aperture device 1211, second aperture device 1212, and third aperture device 1213 are connected using corresponding support arms 1251, 1252, and 1253 that are connected to a chassis 1240. The entire structure moves along at a certain distance off the ground 1299 such that the cut is provided at the desired location on the produce. According to one or more embodiments, this distance can be adjustable to support cutting different height produce. Further the distance between the support arms 1251-1253 and corresponding aperture devices 1211-1213 can also be adjusted to support different width produce and produce rows.

Figure 13:
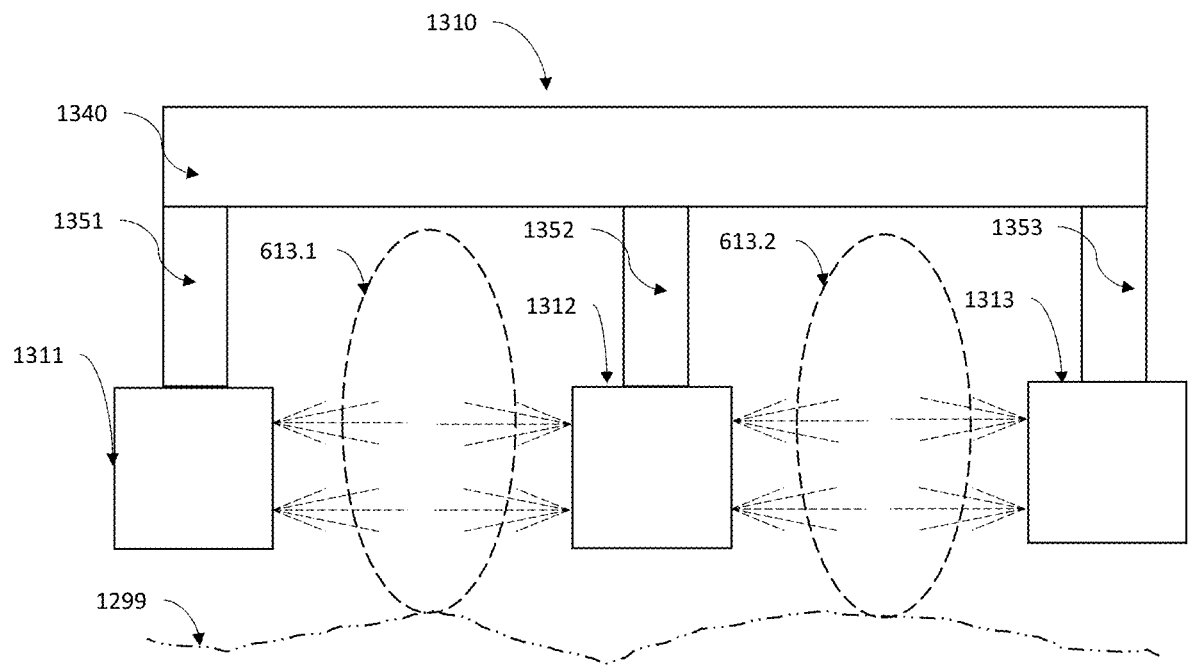
FIG. 13 illustrates a front view a redundant aperture arrangement of a fluid knife system in accordance with one or more embodiments.

FIG. 13 illustrates a front view of a redundant aperture arrangement of a fluid knife system 1310 in accordance with one or more embodiments. The fluid knife system 1310 includes a first aperture device 1311, a second aperture device 1312, and a third aperture device 1313. The first aperture device 1311, second aperture device 1312, and third aperture device 1313 can each include a plurality of aperture openings from which a fluid can be sprayed at produce 613.1 and 613.2. According to one or more embodiments, any one of the apertures can be implemented using one or more nozzles.

Specifically, as shown the first aperture device 1311 can include a set of vertically arranged apertures that spray fluid toward the produce 613.1. Further, the third aperture device 1313 can include a set of vertically arranged apertures that spray fluid toward the produce 613.2. Additionally, the second aperture device 1312 is positioned between the first aperture device 1311 and the third aperture device 1313 as shown. The second aperture device 1312 can be provided with apertures on both sides that spray fluid toward each of the first and second aperture devices 1311 and 1312. Accordingly, as the produce 613.1 and 613.2 comes into contact with each fluid streams, the fluid streams are provided with sufficient force and flow so as to cut the produce 613.1 and 613.2 thereby harvesting the produce 613.1 and 613.2 once the produce passes through all the fluid streams. Accordingly, as shown two rows of produce can be harvested at the same time. This embodiment can be scaled up to support a plurality of rows well in excess of two in accordance with a plurality of different embodiments.

Further, as shown, the first aperture device 1311, second aperture device 1312, and third aperture device 1313 are connected using corresponding support arms 1351, 1352, and 1353 that are connected to a chassis 1340. The entire structure moves along at a certain distance off the ground 1299 such that the cut is provided at the desired location on the produce. According to one or more embodiments, this distance can be adjustable to support cutting different height produce. Further the distance between the support arms 1351-1353 and corresponding aperture devices 1311-1313 can also be adjusted to support different width produce and produce rows.

Figure 14A:
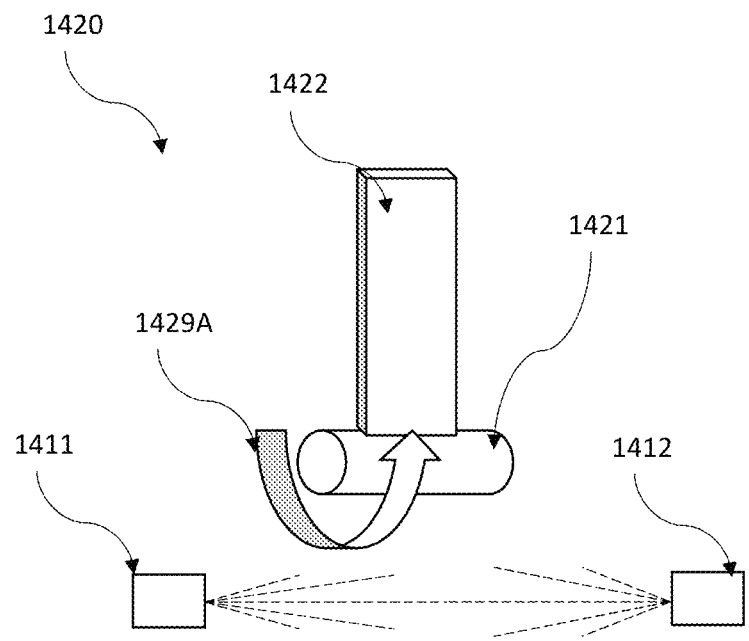
FIG. 14A illustrates a front view of a roller bar with a finger and apertures of a fluid knife system in accordance with one or more embodiments.

FIG. 14A illustrates a front view of a roller bar with a finger 1420 and apertures 1411 and 1412 of a fluid knife system in accordance with one or more embodiments. The roller bar with a finger 1420 includes a roller bar 1421 and a finger 1422 extending radially outward from the roller bar 1421 such that the finger 1422 can receive produce after the aperture devices 1411-1412 cut the produce. Further, the roller bar 1421 rotates in a direction 1429 such that the finger 1422 swings through and up through the fluid stream that cuts the produce thereby lifting the produce up and away toward a conveyer. According to one or more embodiments, the roller bar 1421 is adjacent to the fluid knife system and is parallel to ground and perpendicular to the travel direction of the harvester and rotates 1429A on its axis turning the finger 1422 upward at a front-end of the harvester lifting the produce cut by the fluid knife system apertures 1411 and 1412. This arrangement can be scaled up by adding additional fingers and apertures that are offset from each other as shown below in FIGS. 15A and 15B.

Figure 14B:
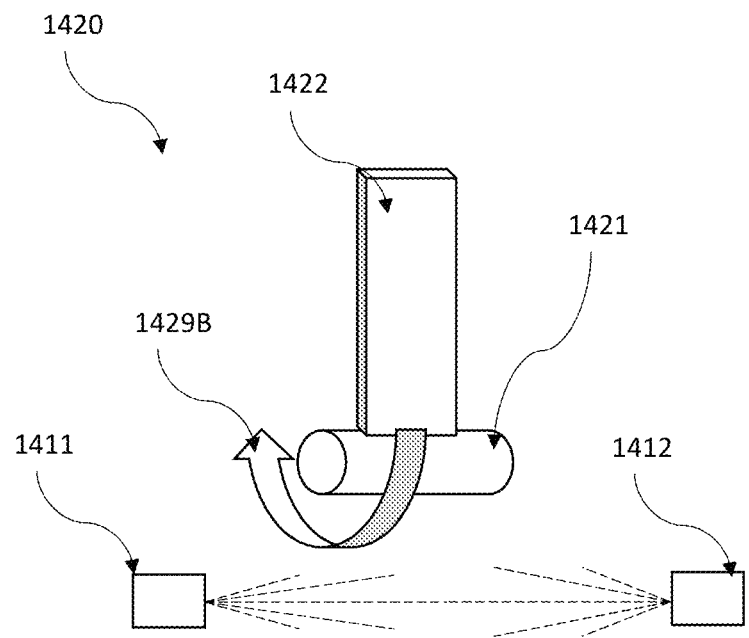
FIG. 14B illustrates a front view of a roller bar with a finger and apertures of a fluid knife system in accordance with one or more embodiments.

FIG. 14B illustrates a front view of a roller bar with a finger 1420 and apertures 1411 and 1412 of a fluid knife system in accordance with one or more embodiments. The roller bar with a finger 1420 includes a roller bar 1421 and a finger 1422 extending radially outward from the roller bar 1421 such that the finger 1422 can receive produce after the aperture devices 1411-1412 cut the produce. Further, the roller bar 1421 rotates in a direction 1429 such that the finger 1422 swings through and up through the fluid stream that cuts the produce thereby lifting the produce up and away toward a conveyer. According to one or more embodiments, the roller bar 1421 is adjacent to the fluid knife system and is parallel to ground and perpendicular to the travel direction of the harvester and rotates 1429B on its axis turning the finger 1422 downward at a front-end of the harvester pushing the produce cut by the fluid knife system apertures 1411 and 1412 down onto a conveyer. This arrangement can be scaled up by adding additional fingers and apertures that are offset from each other as shown below in FIGS. 15A and 15B.

Figure 15A:
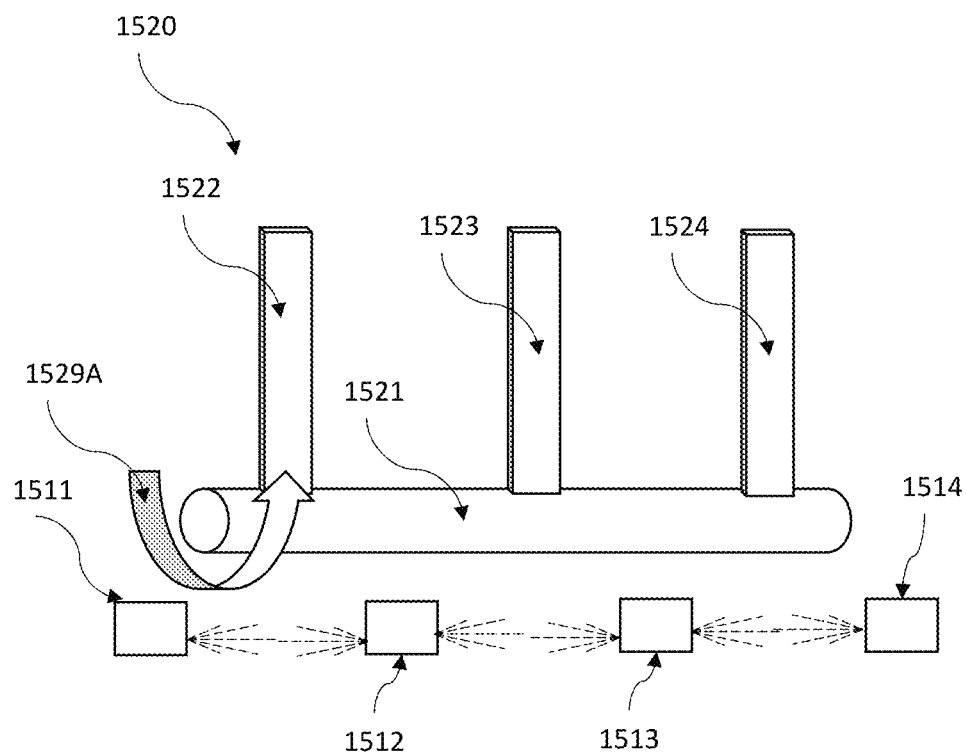
FIG. 15A illustrates a front view of a roller bar with a plurality of finger and apertures of a fluid knife system in accordance with one or more embodiments.

FIG. 15A illustrates a front view of a roller bar with a plurality of fingers 1520 that includes a roller bar 1521 and a plurality of fingers 1522, 1523, and 1524 also includes apertures 1511, 1512, 1513, and 1514 of a fluid knife system in accordance with one or more embodiments.

The roller bar with a finger 1520 includes a roller bar 1521 and fingers 1522-1524 extending radially outward from the roller bar 1521 such that the fingers 1522-1524 can receive produce after the aperture devices 1511-1514 cut the produce. Further, the roller bar 1521 rotates in a direction 1529 such that the fingers 1522-1523 swing through and up through the fluid streams that cut the produce thereby lifting the produce up and away toward a conveyer. According to one or more embodiments, the roller bar 1521 is adjacent to the fluid knife system and is parallel to ground and perpendicular to the travel direction of the harvester and rotates 1529A on its axis turning the fingers 1522-1524 upward at a front-end of the harvester lifting the produce cut by the fluid knife system apertures 1511-1514.

Figure 15B:
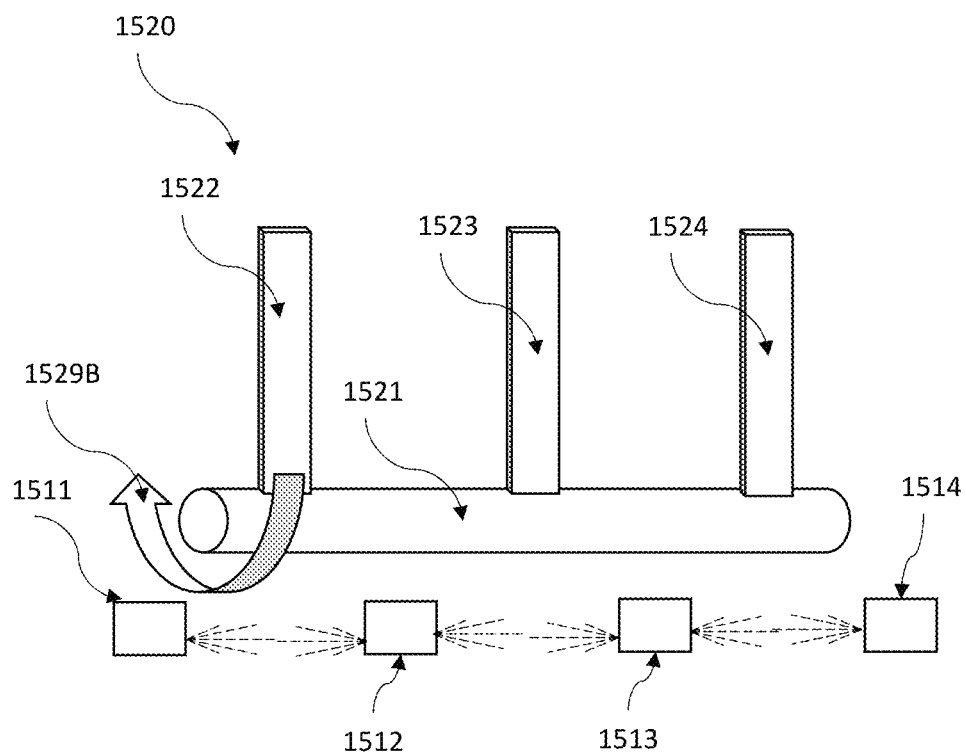
FIG. 15B illustrates a front view of a roller bar with a plurality of finger and apertures of a fluid knife system in accordance with one or more embodiments.

FIG. 15B illustrates a front view of a roller bar with a plurality of fingers 1520 that includes a roller bar 1521 and a plurality of fingers 1522, 1523, and 1524 also includes apertures 1511, 1512, 1513, and 1514 of a fluid knife system in accordance with one or more embodiments.

The roller bar with a finger 1520 includes a roller bar 1521 and fingers 1522-1524 extending radially outward from the roller bar 1521 such that the fingers 1522-1524 can receive produce after the aperture devices 1511-1514 cut the produce. Further, the roller bar 1521 rotates in a direction 1529 such that the fingers 1522-1523 swing through and up through the fluid streams that cut the produce thereby lifting the produce up and away toward a conveyer. According to one or more embodiments, the roller bar 1521 is adjacent to the fluid knife system and is parallel to ground and perpendicular to the travel direction of the harvester and rotates 1529B on its axis turning the fingers 1522-1524 downward at a front-end of the harvester pushing the produce cut by the fluid knife system apertures 1511-1514 down onto a conveyer.

Figure 16A:
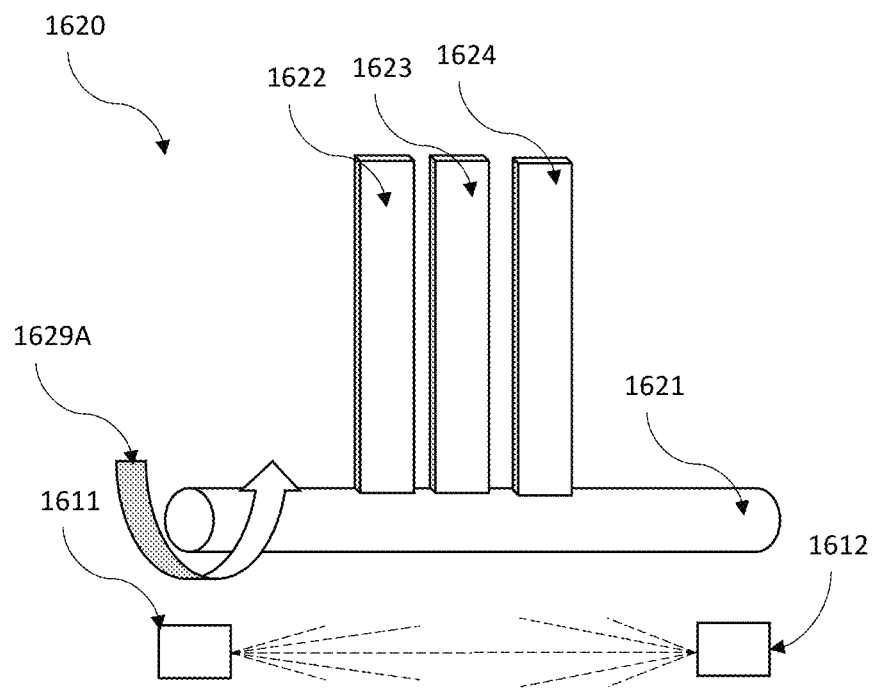
FIG. 16A illustrates a front view of a roller bar with a plurality of finger and apertures of a fluid knife system in accordance with one or more embodiments.

FIG. 16A illustrates a front view of a roller bar with a plurality of fingers 1620 and apertures 1611 and 1612 of a fluid knife system in accordance with one or more embodiments.

The roller bar with a plurality of fingers 1620 includes a roller bar 1621 and a plurality of fingers 1622, 1623, and 1624 extending radially outward from the roller bar 1621 such that the fingers 1622-1624 can receive produce after the aperture devices 1611-1612 cut the produce. Further, the roller bar 1621 rotates in a direction 1629A such that the fingers 1622-1624 swing through and up through the fluid stream that cuts the produce thereby lifting the produce up and away toward a conveyer. According to one or more embodiments, the roller bar 1621 is adjacent to the fluid knife system and is parallel to ground and perpendicular to the travel direction of the harvester and rotates 1629 on its axis turning the fingers 1622-1624 upward at a front-end of the harvester lifting the produce cut by the fluid knife system apertures 1611 and 1612.

Figure 16B:
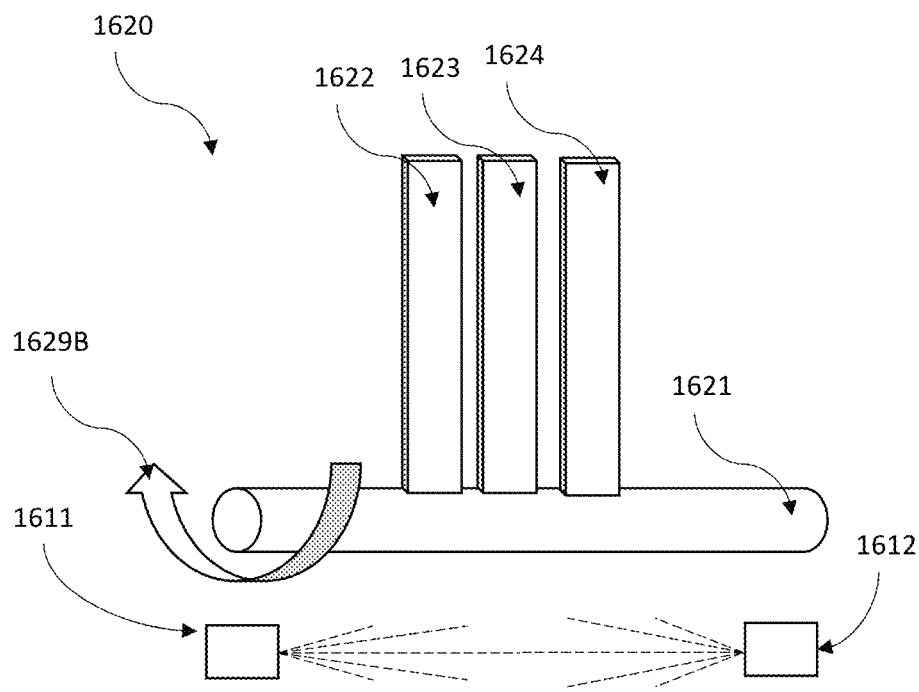
FIG. 16B illustrates a front view of a roller bar with a plurality of finger and apertures of a fluid knife system in accordance with one or more embodiments.

FIG. 16B illustrates a front view of a roller bar with a plurality of fingers 1620 and apertures 1611 and 1612 of a fluid knife system in accordance with one or more embodiments.

The roller bar with a plurality of fingers 1620 includes a roller bar 1621 and a plurality of fingers 1622, 1623, and 1624 extending radially outward from the roller bar 1621 such that the fingers 1622-1624 can receive produce after the aperture devices 1611-1612 cut the produce. Further, the roller bar 1621 rotates in a direction 1629B such that the fingers 1622-1624 swing down through the fluid stream that cuts the produce thereby pushing the produce down and onto a conveyer. According to one or more embodiments, the roller bar 1621 is adjacent to the fluid knife system and is parallel to ground and perpendicular to the travel direction of the harvester and rotates 1629 on its axis turning the fingers 1622-1624 upward at a front-end of the harvester lifting the produce cut by the fluid knife system apertures 1611 and 1612.

According to one or more embodiments, the one or more fingers can be made of an elastomer material such as a plastic or rubber. According to one or more embodiments, the one or more fingers can be provided with a large variety of different dimensions. Further according other embodiments, the fingers can be shaped into other shapes beyond the rectangular shape shown such as parabola, a triangle, and other geometric shapes.

Figure 17A:
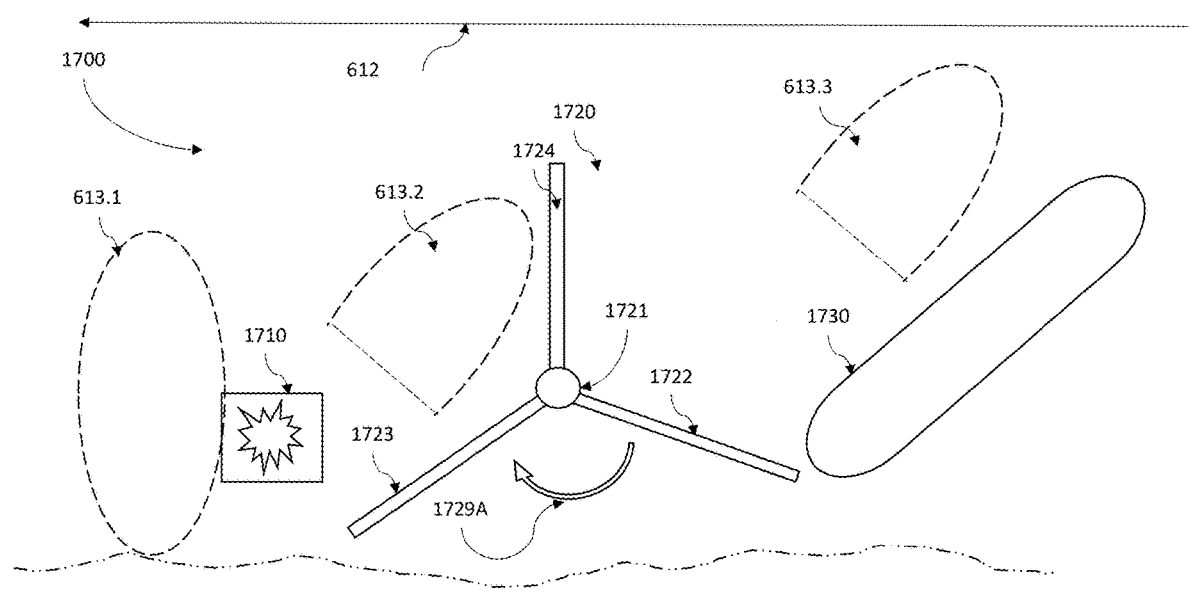
FIG. 17A illustrates a side view of a front-end portion of a harvester that includes a fluid knife system, a roller bar, and a first conveyer in accordance with one or more embodiments.

FIG. 17A illustrates a side view of a front-end portion of a harvester 1700 that includes a fluid knife system 1710, a roller bar with fingers device 1720, and a first conveyer 1730 in accordance with one or more embodiments. The harvester 1700 is moving along the shown direction 612. Further, as shown, produce 613.1 is shown before being cut. Next a piece of cut produce 613.2, which was cut by the fluid knife system 1710, is shown being moved by the roller bar with fingers device 1720. Finally, in this figure a further piece of cut produce 613.3 is shown traveling up along the conveyer 1730. The roller bar with fingers device 1720 includes a roller bar 1721 and a plurality of fingers 1722, 1723, and 1724 extending off the roller bar 1721 in a plurality of different directions. As shown the roller bar 1721 and fingers 1722-1724 rotate in a direction 1729A such that the produce is lifted up after being cut by the fluid knife system 1710 and then deposited on to the conveyer 1730.

Figure 17B:
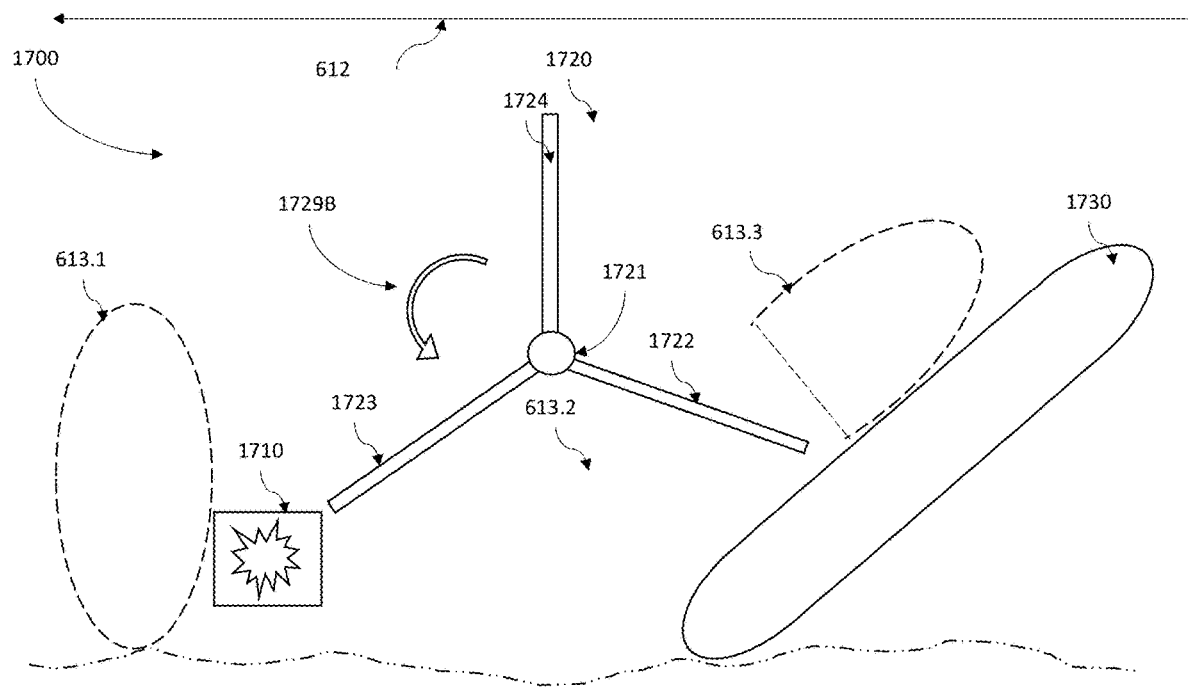
FIG. 17B illustrates a side view of a front-end portion of a harvester that includes a fluid knife system, a roller bar, and a first conveyer in accordance with one or more embodiments.

FIG. 17B illustrates a side view of a front-end portion of a harvester 1700 that includes a fluid knife system 1710, a roller bar with fingers device 1720, and a first conveyer 1730 in accordance with one or more embodiments. The harvester 1700 is moving along the shown direction 612. Further, as shown, produce 613.1 is shown before being cut. Next a piece of cut produce 613.2, which was cut by the fluid knife system 1710, is shown being moved by the roller bar with fingers device 1720. Finally, in this figure a further piece of cut produce 613.3 is shown traveling up along the conveyer 1730. The roller bar with fingers device 1720 includes a roller bar 1721 and a plurality of fingers 1722, 1723, and 1724 extending off the roller bar 1721 in a plurality of different directions. As shown the roller bar 1721 and fingers 1722-1724 rotate in a direction 1729B such that the produce is pushed down after being cut by the fluid knife system 1710 and then deposited on to the conveyer 1730.

Figure 18:
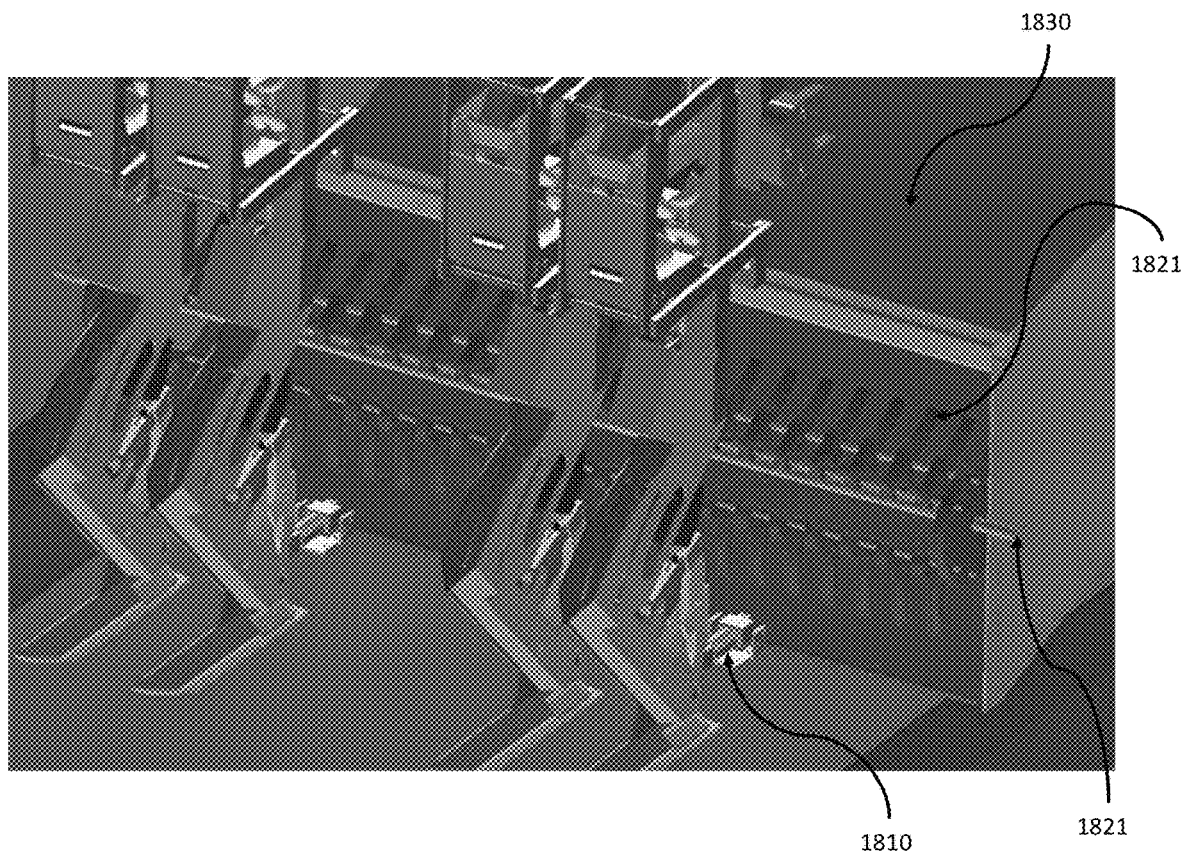
FIG. 18 illustrates a perspective view of a front-end portion of a harvester that includes a fluid knife system, a roller bar, and a first conveyer in accordance with one or more embodiments.

FIG. 18 illustrates a perspective view of a front-end portion of a harvester that includes a fluid knife system 1810, a roller bar 1821, fingers 1822, and a first conveyer 1830 in accordance with one or more embodiments. As shown, the fluid knife system 1810 includes four sets of apertures that are protected by pointed housings. The fluid knife system 1810 is provided with pressurized fluid through fluid hoses that lead back to a pump and liquid holding system. Also, the roller bar 1821 as shown includes a plurality of rods connected between two circular plates along a circumference of the two circular plates forming a cylinder shape. Further, the plurality of fingers 1822 is distributed among the plurality of rods. Specifically, three fingers are connected to each rod segment between the aperture devices.

Figure 19:
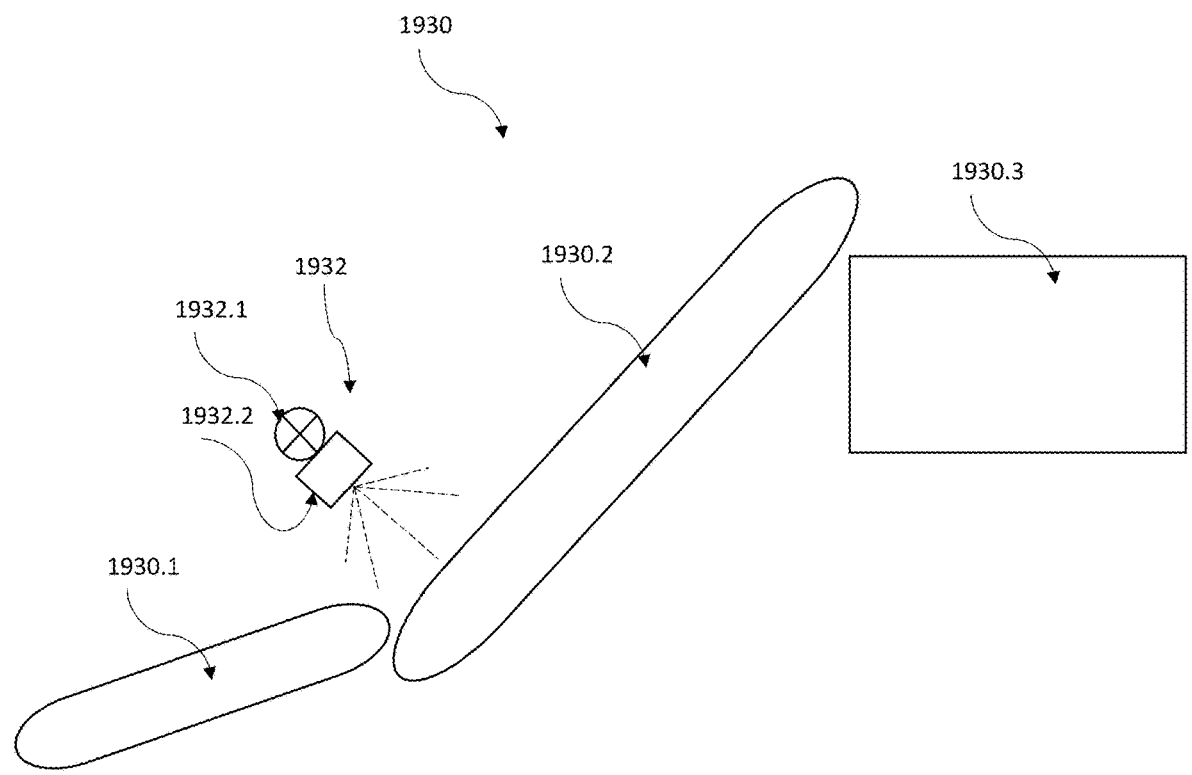
FIG. 19 illustrates a side view a plurality of conveyers that include a spray bar in accordance with one or more embodiments.

FIG. 19 illustrates a side view a plurality of conveyers 1930 that include a spray bar 1932 in accordance with one or more embodiments. The plurality of conveyers includes a feed conveyer 1930.1 and a lift conveyer 1930.2 that feeds to other conveyers 1930.3 and other elements of the harvester. According to one or more embodiments, the spray bar 1932 includes a bar 1931.1 that extends parallel to the conveyers and perpendicular to the travel direction of the harvester. Attached to the bar 1931.1 is at least one aperture device 1932.2 that is configured with one or more nozzles that spray a fluid toward produce that is traveling along the conveyers. Specifically, as shown, the spray bar 1932 is located such that the spray bar sprays the produce as the produce first begins to travel up the lift conveyer 1930.2. According to one or more embodiments, the spray bar 1932 can be used to rinse the produce with water to remove particulate matter from the produce. According to another embodiment, the spray bar 1932 can spray the produce with a wash solution that can be provided to kill microbes and/or protect the produce.

Figure 20:
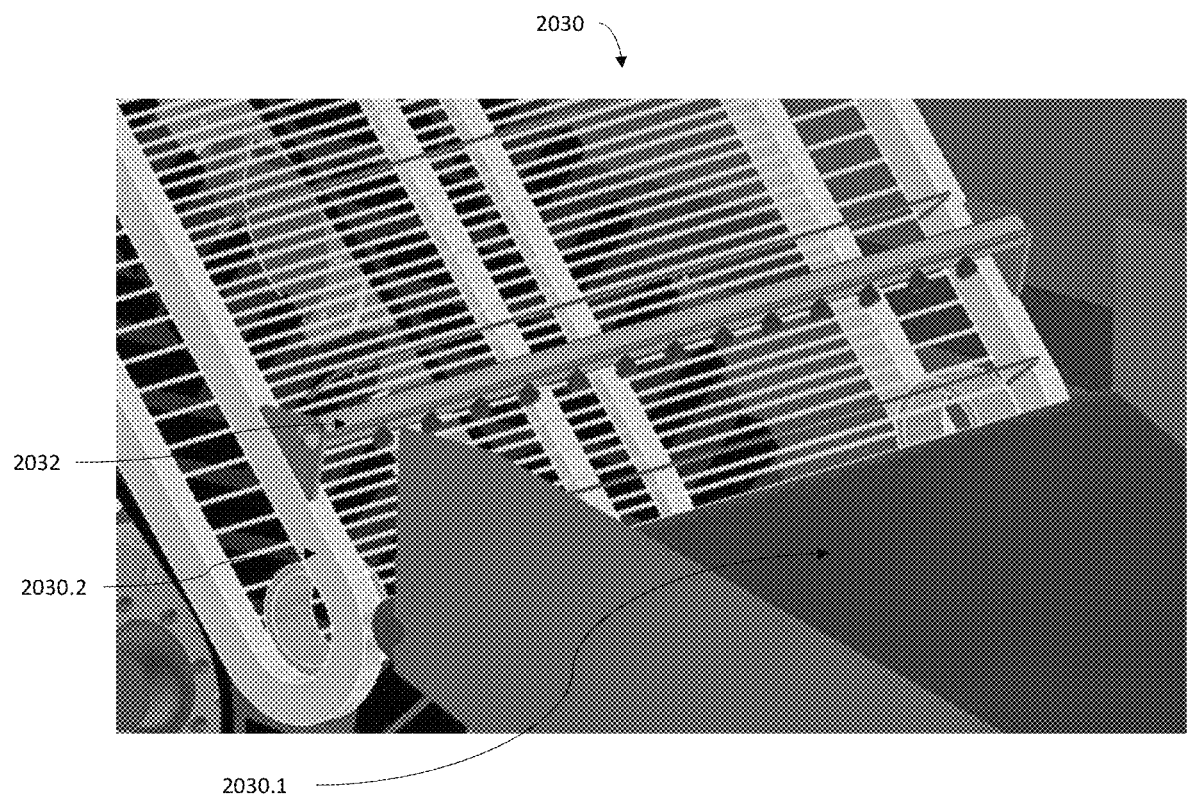
FIG. 20 illustrates a perspective view of a plurality of conveyers that include a spray bar in accordance with one or more embodiments.

FIG. 20 illustrates a perspective view of a plurality of conveyers 2030 that include a spray bar 2032 in accordance with one or more embodiments. As shown a lift conveyer 2030.2 is shown. Additionally, feed conveyer 2030.1 is shown. The spray bar 2032 includes a rod as shown that extends across the lift conveyer 2030.2. The spray bar 2032 also includes a plurality of aperture devices evenly spaced apart along the rod such that the aperture devices spray produce as it travels up the lift conveyer 2030.2.

Further, according to one or more embodiments, the lift conveyer 2030.2 is a parallel bar lift conveyer 2030.2 that includes a first rotating portion located toward the front end along the travel direction of the harvester. The parallel bar lift conveyer 2030.2 also includes a second rotating portion behind and elevated along the travel direction in relation to the first rotating portion. Further, the parallel bar lift conveyer 2030.2 includes a belt that extends around the first rotating portion and the second rotating portion, the belt formed of a plurality of rods extending perpendicular to the travel direction forming the belt, wherein a spacing distance is provided between each of the plurality of rods as shown. This provides openings that the produce can latch onto and travel up the conveyer without the need for additional parts, complexity, and without increasing the size of the lift conveyer.

Figure 21:
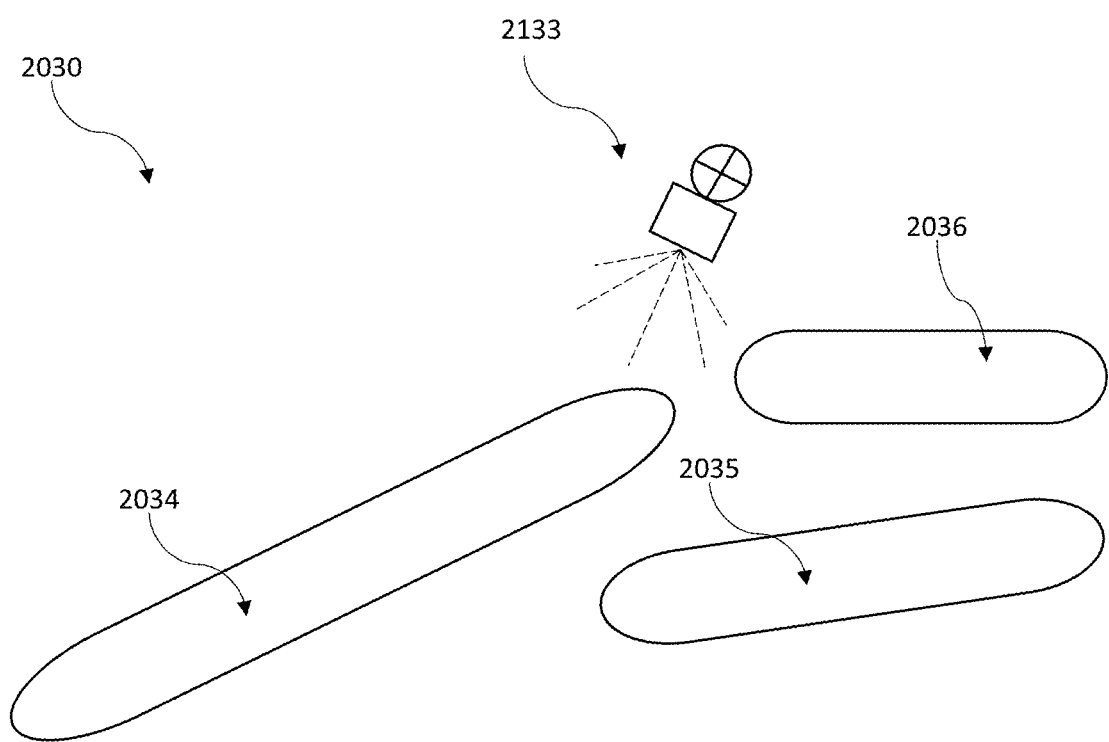
FIG. 21 illustrates a side view of a plurality of conveyers that include an air knife in accordance with one or more embodiments.

FIG. 21 illustrates a side view of a plurality of conveyers 2030 that include an air knife 2133 in accordance with one or more embodiments. The air knife 2133 positioned over the trash reduction zone 2034. The air knife 2133 comprises one or more apertures that spray a gas at the produce being transported by the trash reduction zone 2034 blowing trash particulate off the produce onto a trash conveyer 2035. The produce moves on to the inspection conveyer 2036 for further processing.

Specifically, according to one or more embodiments, the plurality of conveyers 2030 includes a trash reduction zone 2034 that receives the produce from a lift conveyer and transports the produce along the travel direction of the harvester. Also included is an inspection conveyer 2036 that receives the produce from the trash reduction zone 2034. According to one embodiment, the inspection conveyer 2036 can transport the produce perpendicular to the travel direction outward to either side of the harvester. According to other embodiments the inspection conveyer 2036 can transport the produce in the travel direction of the harvester. Further included is the trash conveyer 2035 that receives trash from the trash reduction zone 2034 and air knife 2133 as well as the inspection conveyer 2036 and transports the trash off the harvester.

Figure 22:
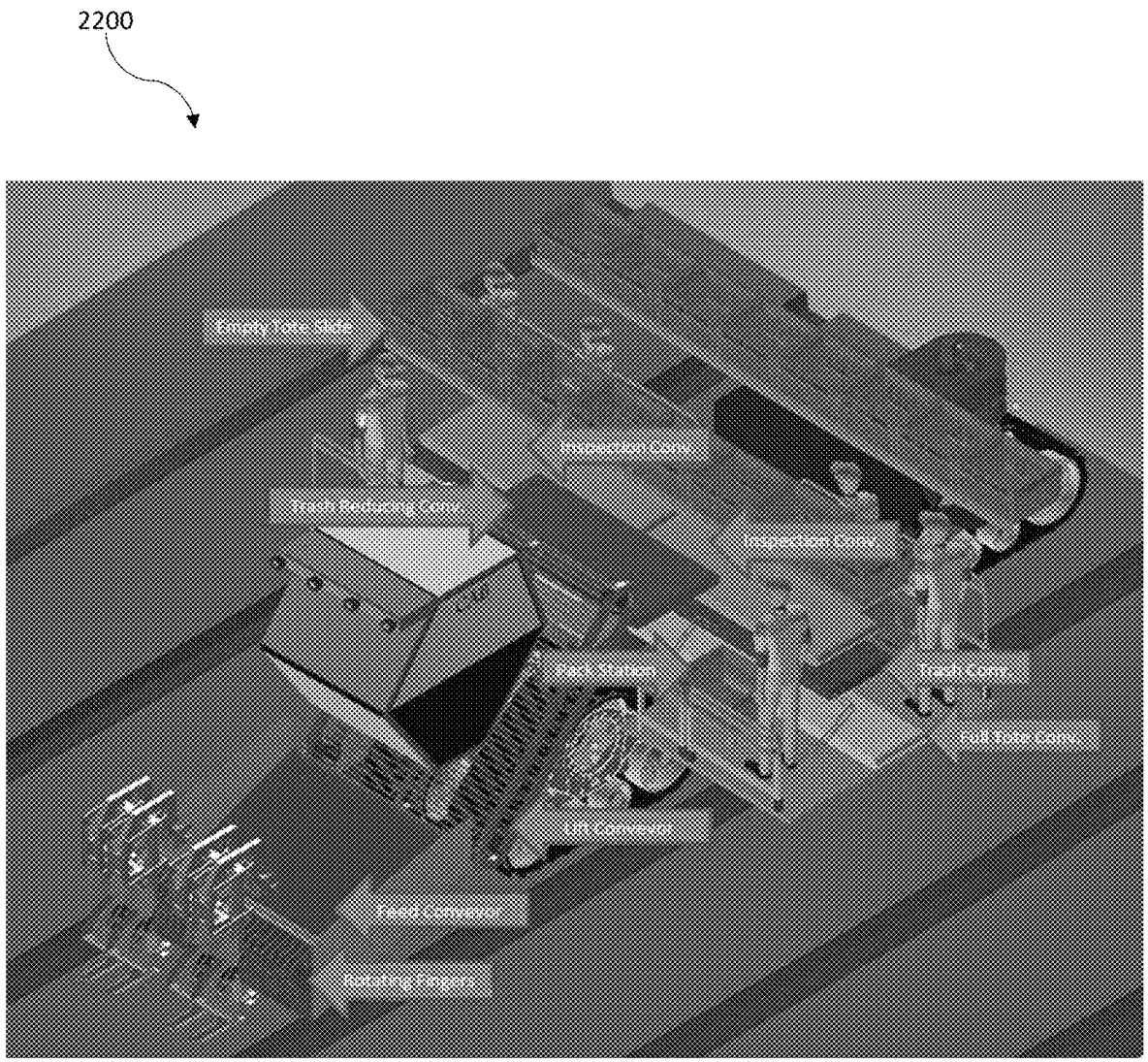
FIG. 22 illustrates a perspective view of a harvester as it is actively harvesting produce in accordance with one or more embodiments.

FIG. 22 illustrates a perspective view of a harvester 2200 as it is actively harvesting produce in accordance with one or more embodiments. As shown, the harvester 2200 includes, rotating fingers at a front-end of the harvester 2200. The rotating fingers are followed by a feed conveyer and then a lift conveyer. Next is provided a trash reduction zone that feeds into one or more inspection conveyers. Trash conveyers are placed below such that they can catch trash and discarded items from the produce processing. The harvester further includes a packing station that includes empty tote slides and full tote conveyer as well as totes that are filled with processed produce and then moved off the harvester.

Further, as shown in FIG. 22, the harvester 2200 may include a three track system. The three track system may include two non-articulating track systems in the front of the harvester and one articulating track system in the rear. All three tracks may be independently powered and each track system may be mounted in a way that the position of the track can be relocated to adjust to different bed widths. Accordingly, the harvester can drive on the bed top thereby avoiding adjacent rows of produce.

Figure 23:
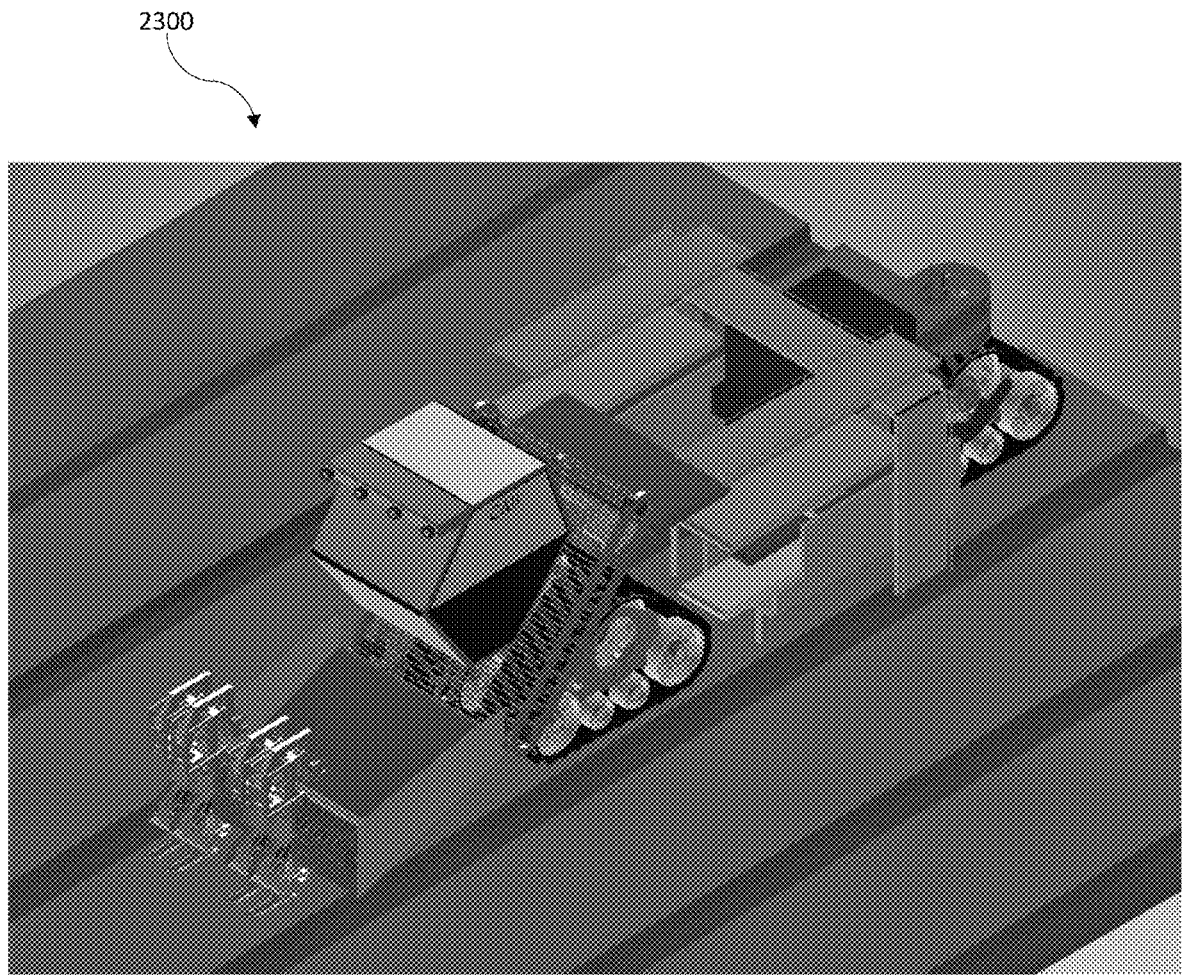
FIG. 23 illustrates a perspective view of a harvester in transport state in accordance with one or more embodiments.

FIG. 23 illustrates a perspective view of a harvester 2300 in transport mode, which may also be called a transport state, in accordance with one or more embodiments. As shown, the inspection conveyers and trash conveyers have been rotated 90 degrees inward reducing the width of the harvester. Additionally, the empty tote slides and the full tote conveyers are rotated in part and also folded as shown to further reduce the width and overall size of the harvester.

Figure 24:
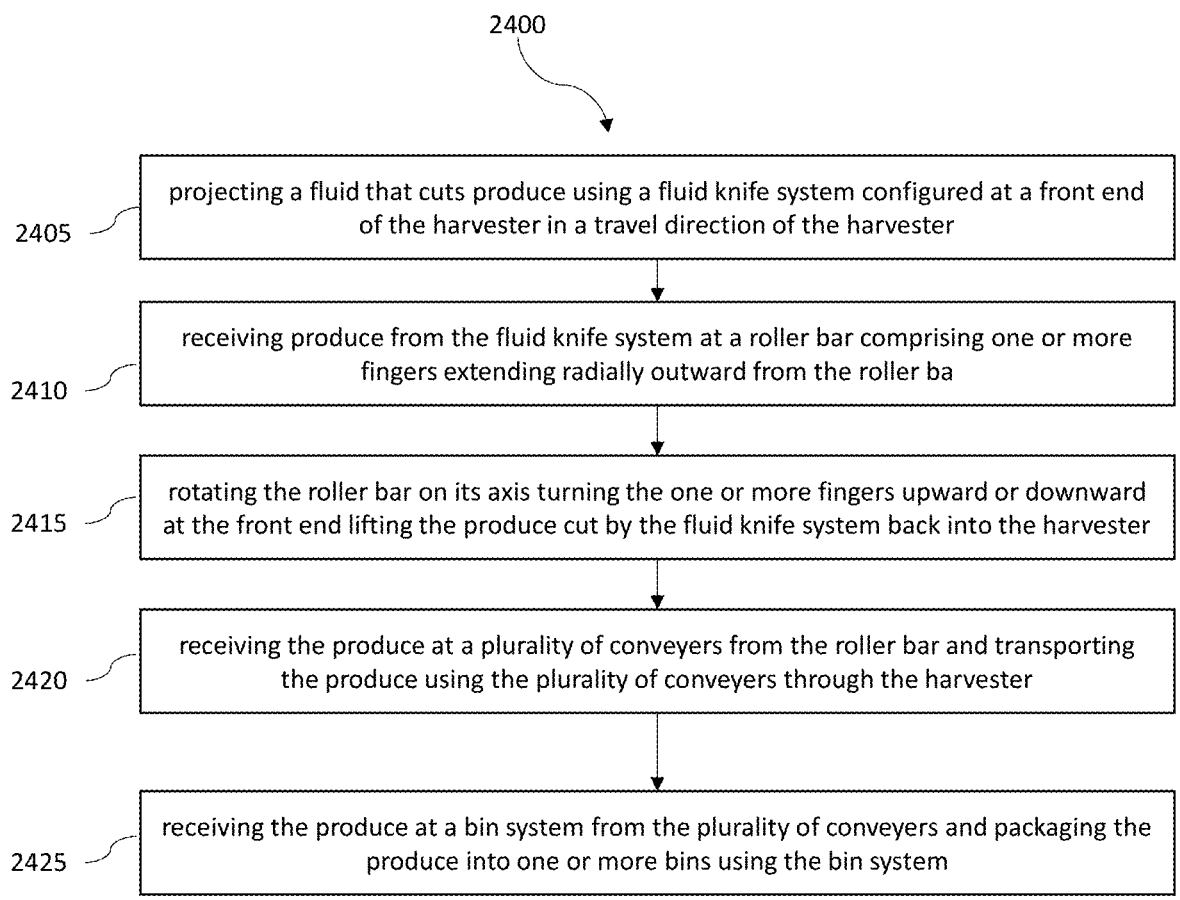
FIG. 24 illustrates a flow chart of a method of operating a harvester for produce in accordance with one or more embodiments.

FIG. 24 illustrates a flow chart of a method 2400 of operating a harvester for produce in accordance with one or more embodiments. The method 2400 includes projecting a fluid that cuts produce using a fluid knife system configured at a front end of the harvester in a travel direction of the harvester (operation 2405). According to one or more embodiments, the fluid knife system projects the fluid using one or more apertures at a pressure and a direction that cuts the produce. The method 2400 further includes receiving produce from the fluid knife system at a roller bar comprising one or more fingers extending radially outward from the roller bar (operation 2410). The method 2400 also includes rotating the roller bar on its axis turning the one or more fingers upward or downward at the front end lifting the produce cut by the fluid knife system back into the harvester (operation 2415), wherein the roller bar is adjacent to the fluid knife system and is parallel to ground and perpendicular to the travel direction. The method 2400 further includes receiving the produce at a plurality of conveyers from the roller bar and transporting the produce using the plurality of conveyers through the harvester (operation 2420). Further, the method 2400 includes receiving the produce at a bin system from the plurality of conveyers and packaging the produce into one or more bins using the bin system (operation 2425).

Figure 25:
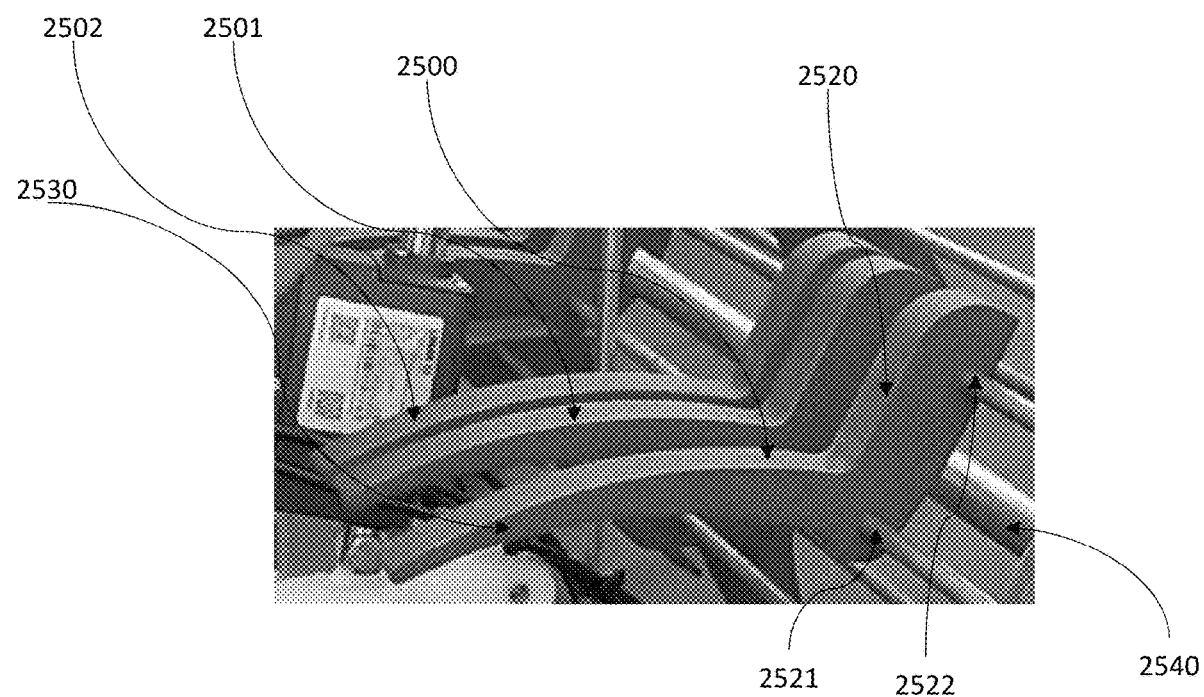
FIG. 25 illustrates a plurality of fingers in accordance with one or more embodiments.

FIG. 25 illustrates a plurality of fingers 2500, 2501, and 2502 in accordance with one or more embodiments. As shown the fingers 2500, 2501, and 2502 are attached to a roller bar 2540. Looking at one of the plurality of fingers 2500, 2501, and 2502 a particular shape is shown in accordance with one or more embodiments. For example, finger 2500 has a base portion 2520 and an elongated curved portion 2530. The base portion includes two holes 2521 and 2522 through that are used to attach the finger 2500 to the roller bar 2540 by having rods of the roller bar 2540 extending through the holes 2521 and 2522.

In accordance with one or more embodiments, one more of the plurality of conveyers can be arranged such that, rather than running and rotating in the same travel direction as the harvester, the conveyers can instead be arranged such that they run perpendicular to the travel direction. This arrangement provides for a more compact and efficient harvester design. Additionally this arrangement helps facilitate the produce processing by naturally moving the produce toward the sides of the harvester where the produce is eventually offloaded. Additionally, by having the conveyers extend lengthwise perpendicular to the travel direction of the harvester, the entry and egress points are on the sides of the harvester which allows for driving elements such as the harvester engine and driver control station to be placed at the front and rear ends without having to try to accommodate for any entry or exit of produce, personnel, etc.

Accordingly, in one or more embodiments a "fold out wings" arrangement for packing with a mechanical cutting apparatus is provided. For example, as shown in FIG. 23, the conveyers can fold up, fold down, swing forward, swing backward, or a combination thereof. According to other embodiments, the conveyers can collapse down in other ways to reduce the harvester profile.

Figure 26A:
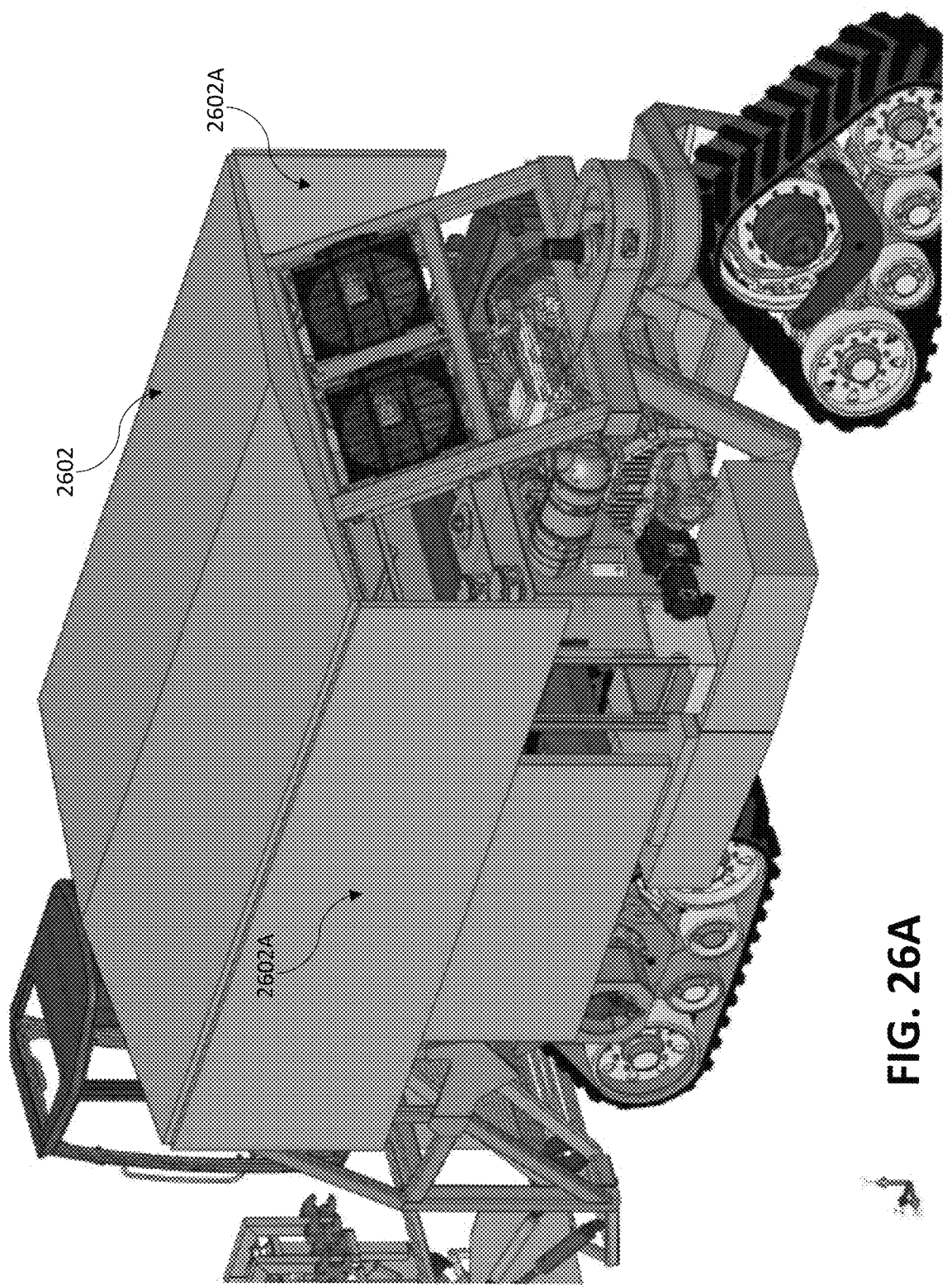
FIGS. 26A and 26B each illustrate a perspective view of a harvester with a covering in accordance with one or more embodiments.
Figure 26B:
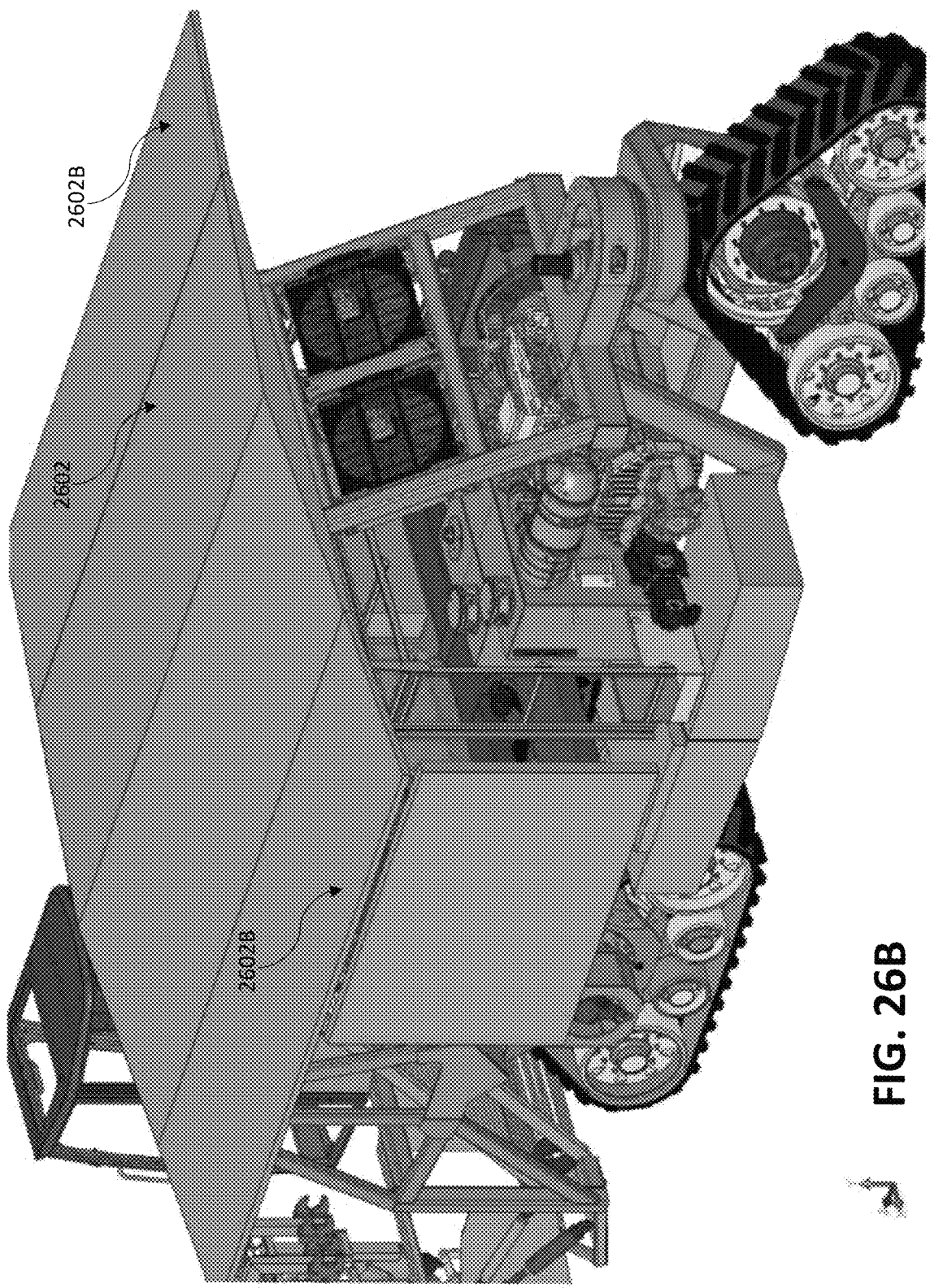

FIGS. 26A and 26B each illustrate a perspective view of a harvester with a covering 2602 in accordance with one or more embodiments. Specifically, as shown in FIG. 26A, the covering 2602 has a top portion and two side portions 2602A that are shown hanging down. When in this arrangement the harvester is considered to be in an inactive state which can also be called a transport state or mode. In this state the harvester elements are stored in a compact and protected manner providing improved maneuverability, storage space usage, and protection of the harvester.

In FIG. 26B the covering 2602 is shown as the harvester begins to transition from an inactive state to an active harvesting state. As shown, the covering 2602 is opened such that the two side portions 2602B are now swung open and up parallel with the top portion of the covering 2602. As shown, this open covering 2602 provides the harvester protection from the elements such as sun and rain.

Figure 27A:
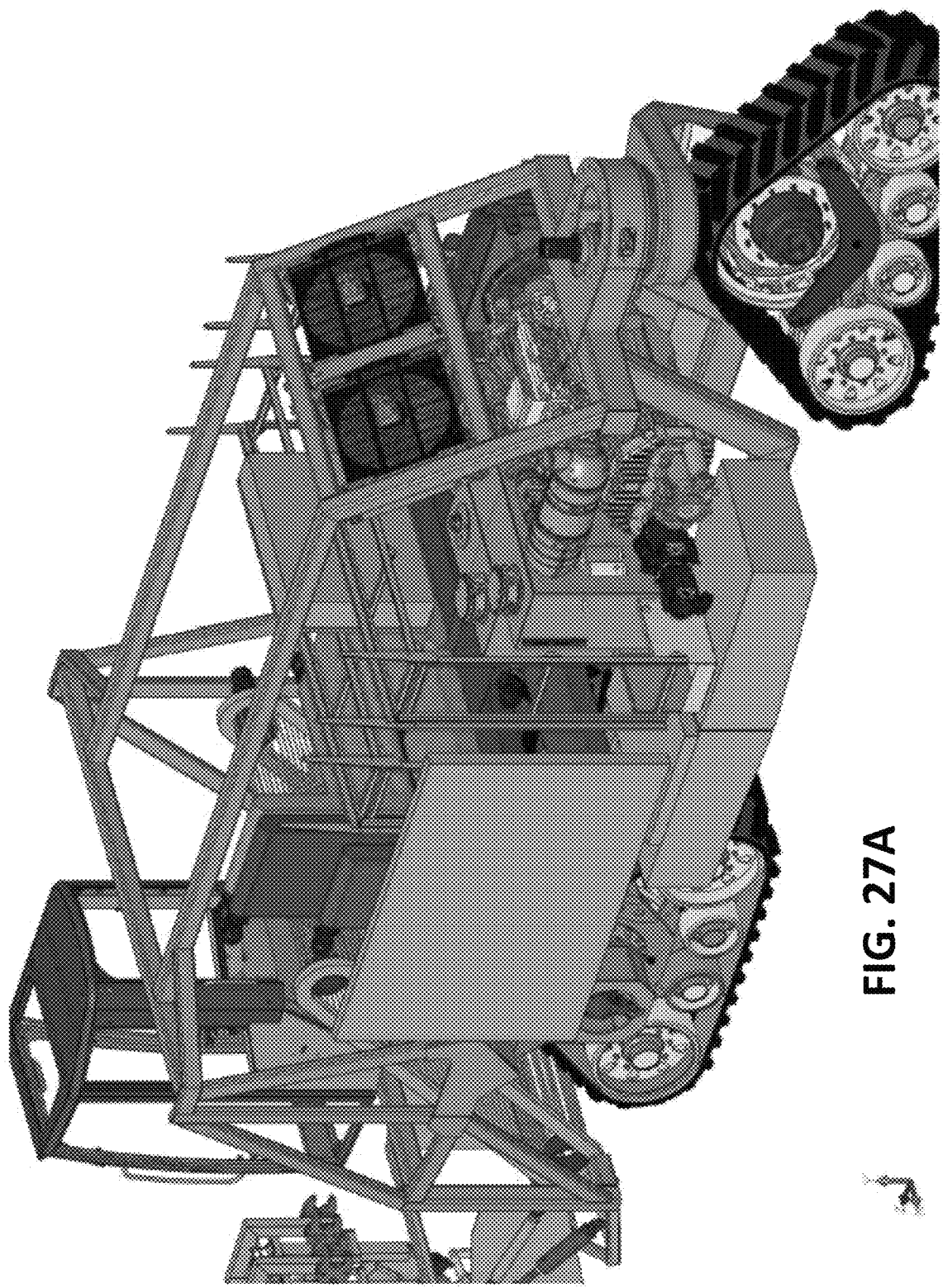
FIGS. 27A, 27B, 27C, and 27D illustrate a perspective view of a harvester transitioning some elements from a transport state to an active state in accordance with one or more embodiments.
Figure 27B:
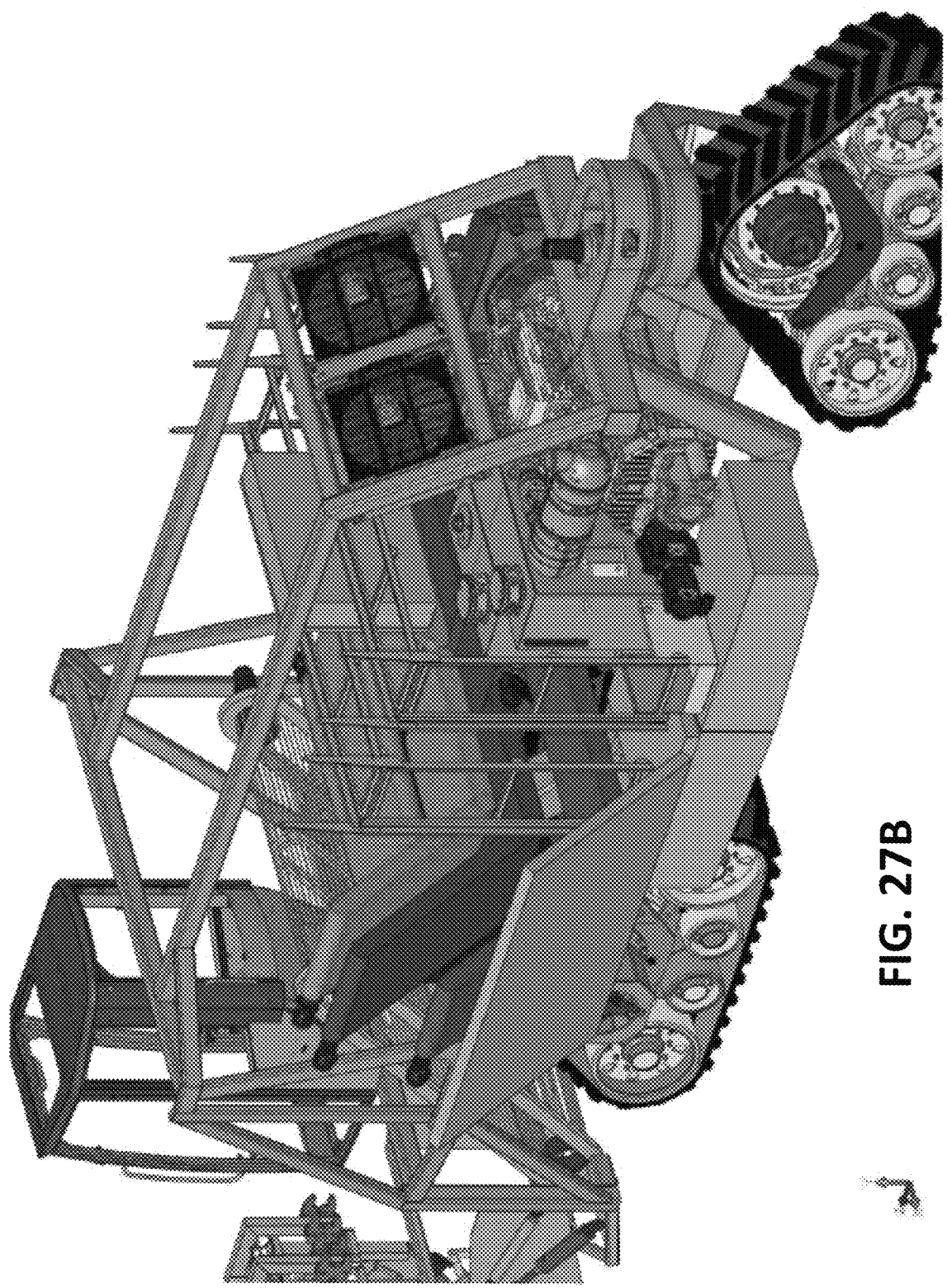
Figure 27C:
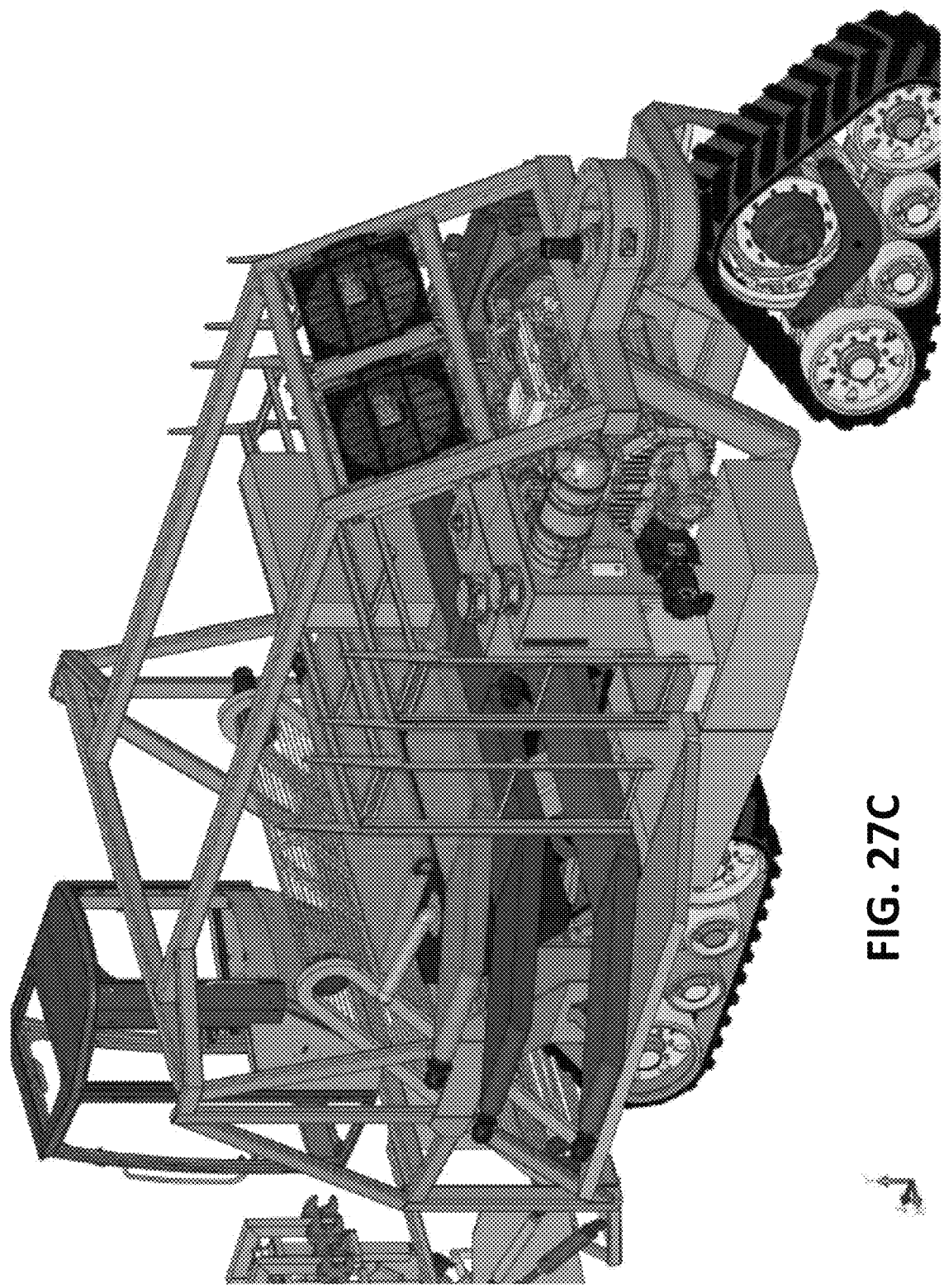
Figure 27D:
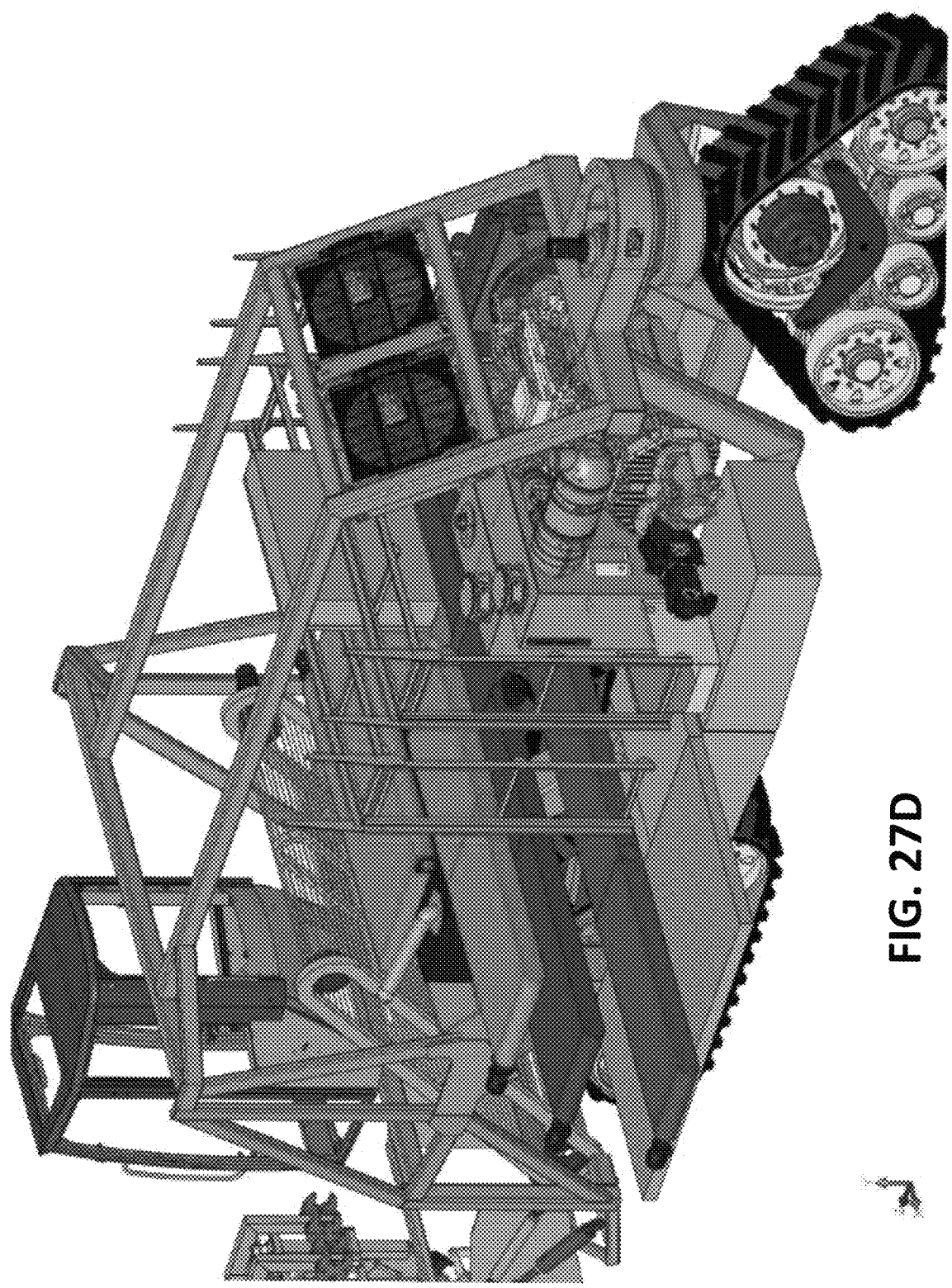

FIGS. 27A, 27B, 27C, and 27D illustrate a perspective view of a harvester transitioning some elements from a transport state to an active state in accordance with one or more embodiments. Specifically, FIG. 27A shows the harvester in an initial inactive state. As shown, the plurality of conveyors and related zones and elements are all in a compact bent stored arrangement. For example, each of the conveyers has a portion that is folded up reducing the overall area the harvester occupies in an inactive state. Moving on the FIG. 27B, it can be appreciated that the plurality of conveyers can transition and move toward an active harvesting state. Specifically, as shown the conveyers are shown in a transitionary position as they unbend from their previous inactive state. FIG. 27C shows these elements moving further toward an active harvesting state. Finally, as shown in FIG. 27D the conveyers are shown in an active state position. Particularly, the conveyers have been lowered from their bent positions such that the conveyers are extending out parallel to the ground and perpendicular to the travel direction of the overall harvester.

Figure 28A:
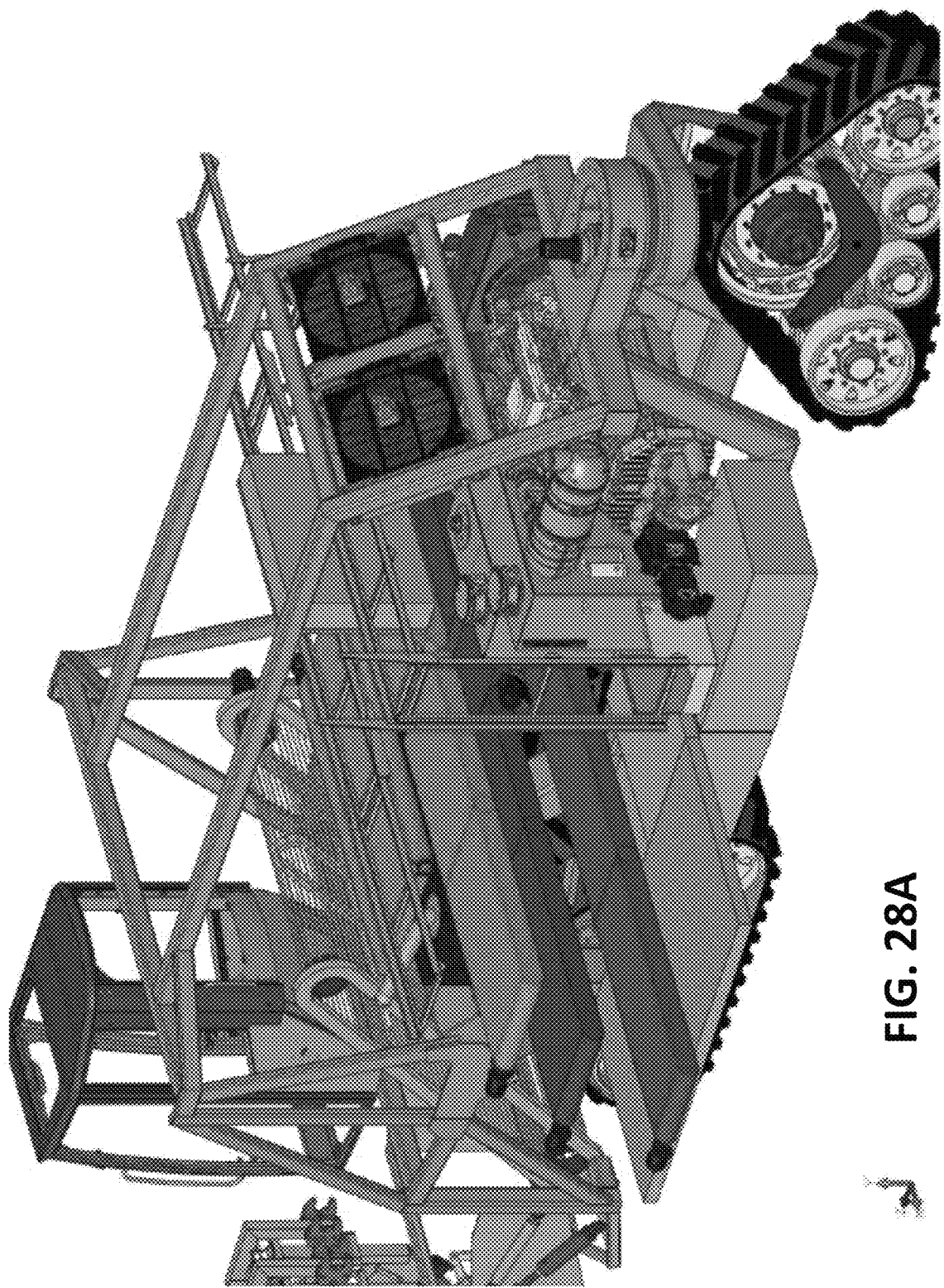
FIGS. 28A, 28B, and 28C illustrate a perspective view of a harvester transitioning some elements from a transport state to an active state in accordance with one or more embodiments.
Figure 28B:
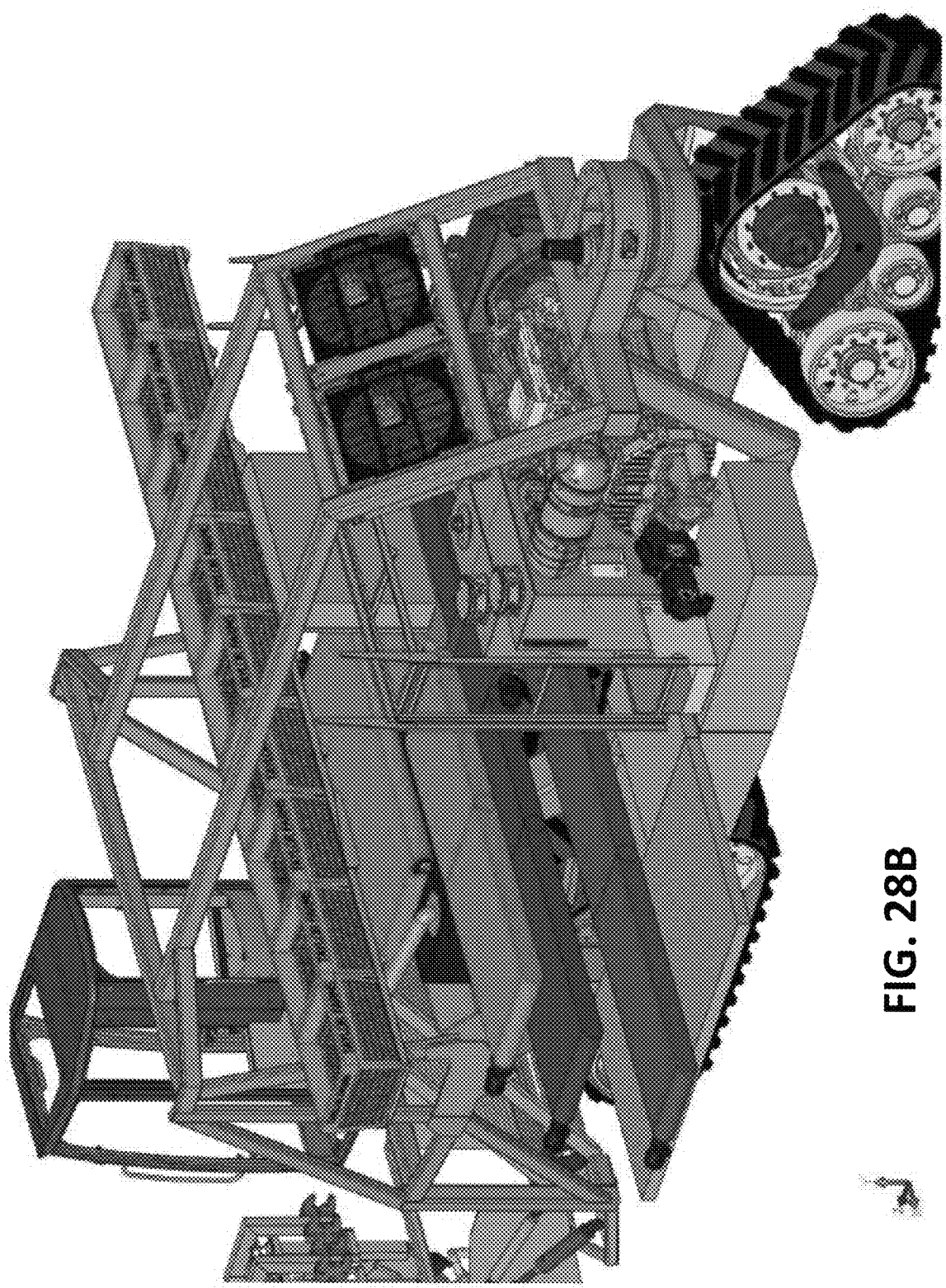
Figure 28C:
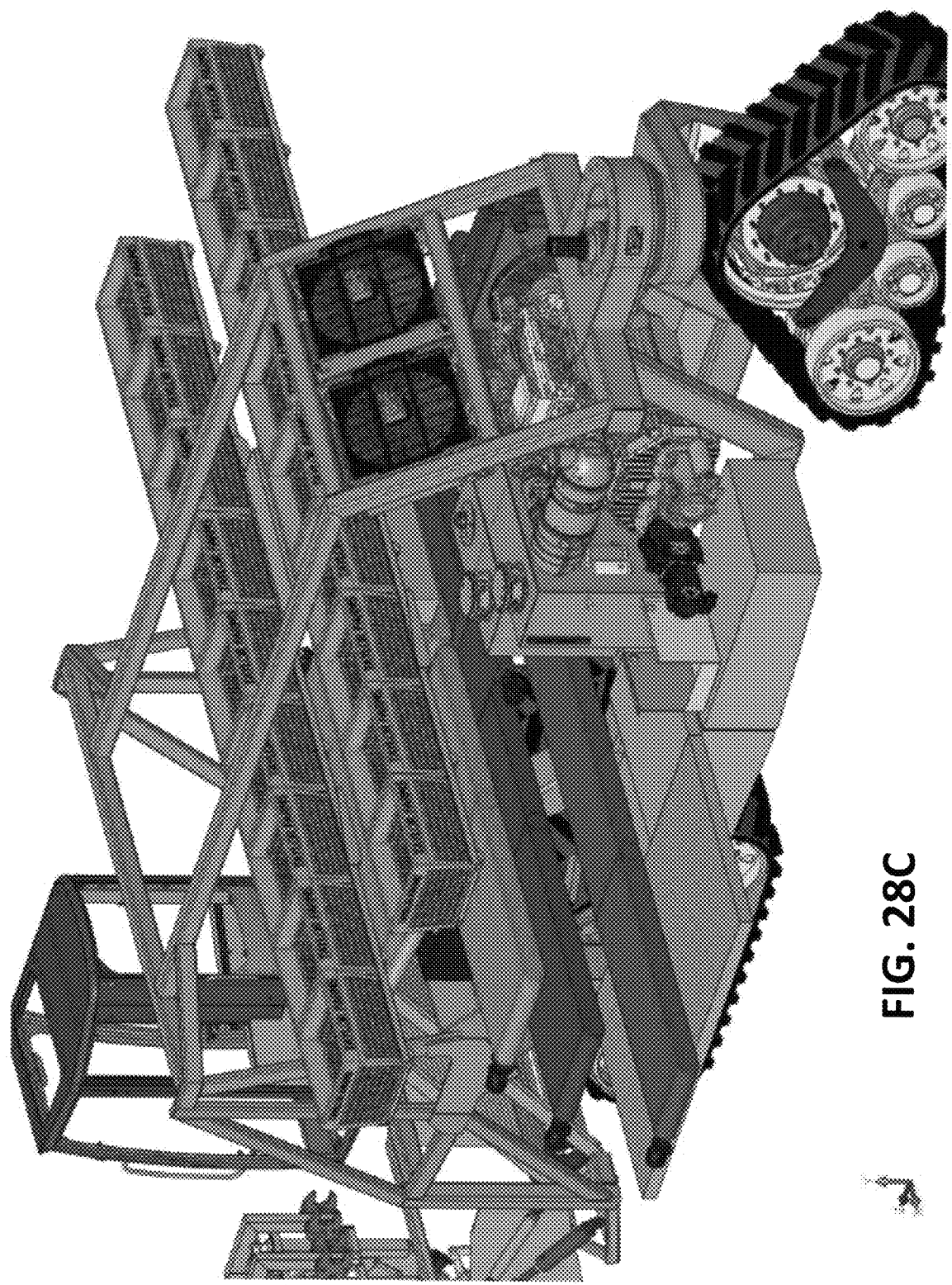

FIGS. 28A, 28B, and 28C illustrate a perspective view of a harvester transitioning some elements from a transport state to an active state in accordance with one or more embodiments. Looking now at FIG. 28A it can be appreciated that a first portion of a bin system is unfolded such that this first portion extend parallel to the ground and perpendicular to the travel direction of the harvester in a similar manner as the conveyers. Once unfolded, the first portion of the bin system can also be adjusted front to back and then loaded with a plurality of bins as shown in FIG. 28B. Further, as shown in FIG. 28C, a second portion of the bin system may also be unfolded and then loaded with bins.

Figure 29:
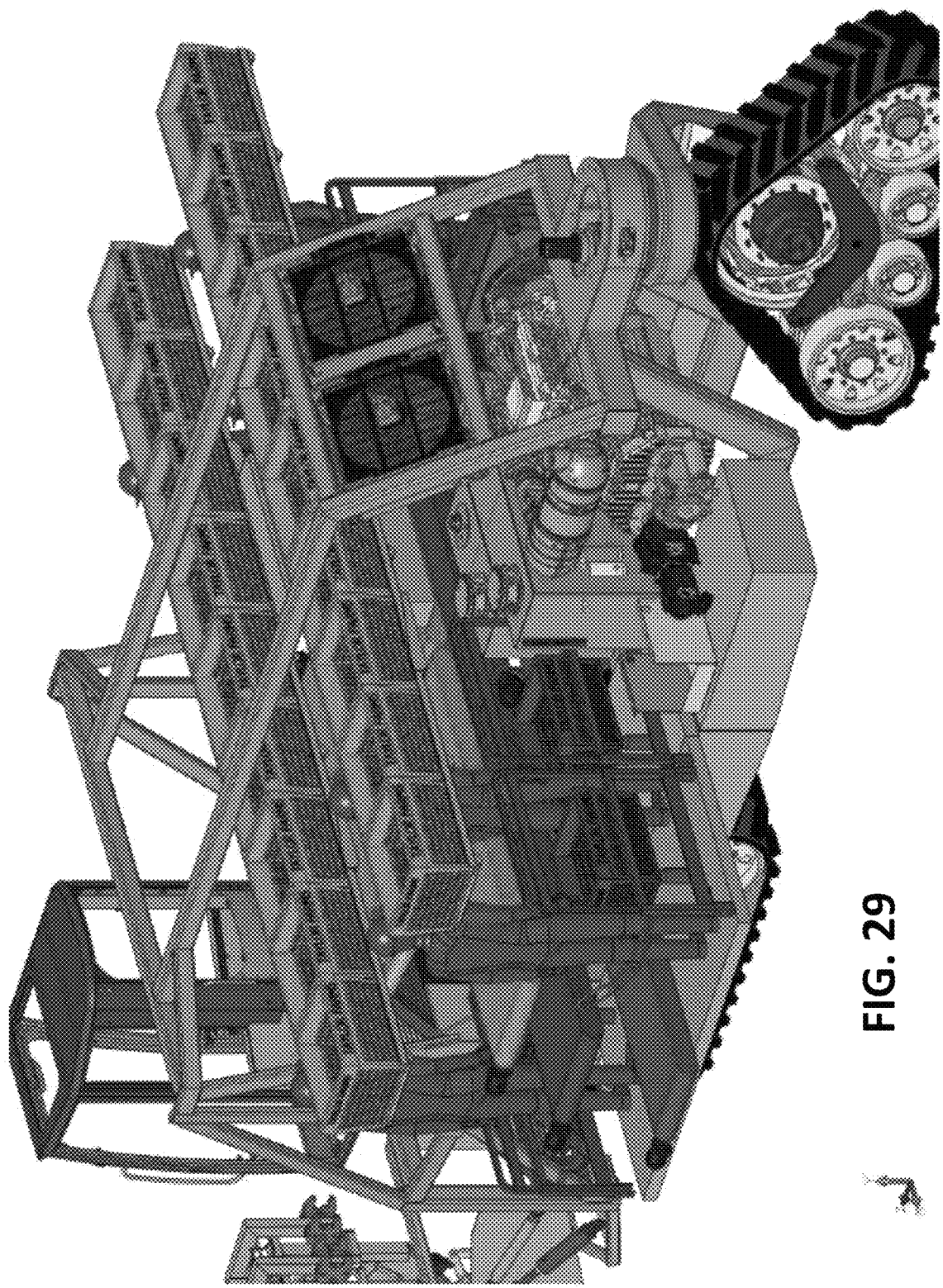
FIG. 29 illustrates a perspective view of a harvester in an active state including suggested personnel placement in accordance with one or more embodiments.

Finally, FIG. 29 illustrates a perspective view of a harvester in an active state including suggested personnel placement in accordance with one or more embodiments. Particularly, as shown in FIG. 29 the harvester is shown such that all elements used for harvesting have been unfolded and positioned into their active state positions. Further, FIG. 29 also shows the placement of harvesting personnel adjacent to the conveyers and bin system.

According to one or more embodiments, a three-track system driving on the bed top of the harvester is provided. A three track system may include two non-articulating track systems in the front of the harvester and one articulating track system in the rear. All three tracks may be independently powered and each track system may be mounted in a way that the position of the track can be relocated to adjust to different bed widths.

One or more advancements, advantages, and/or benefits of one or more of the above embodiments include one or more of the following. Including an area to reduce trash leaves prior to worker inspection of the produce and then having the workers inspect the product and then pack it helps improve the overall quality of the harvested produce. Also, the layout of the harvester in accordance with one or more embodiments makes the harvester more maneuverable to reduce turnaround time at the end of the field thereby increasing overall speed and efficiency.

Increased maneuverability may not only increase production, it may help minimize damage to uncut product. This is one major advantage to driving on the bed top. Traditional harvesters drive in the furrows, this means the tire or track is running right next to or touching uncut product. This is a food safety issue and can cause damage to the product. It is also an area that may be uneven to the adjacent furrow, due to other traffic or erosion making the harvester lean to one side, which makes cutting difficult.

According to an embodiment, a harvester may include a fluid knife system configured at a front end of the harvester in a travel direction of the harvester, wherein the fluid knife system projects a fluid using one or more apertures at a pressure and a direction that cuts produce, a roller bar including one or more fingers extending radially outward from the roller bar configured to receive produce from the fluid knife system, wherein the roller bar is adjacent to the fluid knife system and is parallel to ground and perpendicular to the travel direction and rotates on its axis turning the one or more fingers at the front end lifting the produce cut by the fluid knife system, a plurality of conveyers that receive the produce from the roller bar and are configured to transport the produce through the harvester, and a bin system configured to receive the produce from the plurality of conveyers and package the produce into one or more bins.

The fluid knife system may include a liquid source that provides a flow of the fluid to the one or more apertures, and a liquid pump that provides the liquid from the liquid source at a pressure at the one or more apertures. The rotating bar may include a plurality of rods connected between two circular plates along a circumference of the two circular plates forming a cylinder shape, and wherein the plurality of fingers is distributed among the plurality of rods. The plurality of fingers may be provided in a plurality of finger groups that are spaced apart at equal intervals along the rotating bar. The equal intervals may space apart the plurality of fingers offset from the one or more apertures of the liquid knife system in the travel direction of the harvester.

The plurality of conveyers may include a feed conveyer that receives produce from the roller bar and transports the produce along the travel direction, a lift conveyer that receives the produce from the feed conveyer and transports the produce along the travel direction, a trash reduction zone that receives the produce from the lift conveyer and transports the produce along the travel direction, an inspection conveyer that receives the produce from the trash reduction zone and transports the produce perpendicular to the travel direction outward to either side of the harvester, and a trash conveyer that receives trash from the trash reduction zone and the inspection conveyer and transports the trash off the harvester.

The plurality of conveyers may include a subset of conveyers that extend and rotate in a direction perpendicular to the travel direction of the harvester. The plurality of conveyers may include a front-end spray bar including one or more apertures through which a wash solution is sprayed onto passing produce that is being transported by the lift conveyer. The lift conveyer may be a parallel bar lift conveyer that includes a first rotating portion located toward the front end along the travel direction of the harvester, a second rotating portion behind and elevated along the travel direction in relation to the first rotating portion, and a belt that extends around the first rotating portion and the second rotating portion, the belt formed of a plurality of rods extending perpendicular to the travel direction forming the belt, wherein a spacing distance is provided between each of the plurality of rods. The plurality of conveyers may include an air knife positioned over the trash reduction zone, wherein the air knife includes one or more apertures that spray a gas at the produce being transported by the trash reduction zone blowing trash particulate off the produce onto the trash conveyer.

The bin system may include a plurality of bins that includes the one or more bins configured to carry produce, an empty tote conveyer that transports empty bins from the plurality of bins onto the harvester toward the plurality of conveyers, a pack station where the produce is moved from the plurality of conveyers into at least one bin that is empty from the plurality of bins filling the bin, and a full tote conveyer that receives the filled bin and transports the filled bin of the plurality of bins off the harvester.

According to an embodiment, a harvester may include a fluid knife system configured at a front end of the harvester in a travel direction of the harvester, wherein the fluid knife system projects a fluid using one or more apertures at a pressure and a direction that cuts produce, a plurality of conveyers that receive the produce and are configured to transport the produce through the harvester, wherein the plurality of conveyers includes at least, a parallel bar lift conveyer that includes a first rotating portion located toward the front end along the travel direction of the harvester, a second rotating portion behind and elevated along the travel direction in relation to the first rotating portion, and a belt that extends around the first rotating portion and the second rotating portion, the belt formed of a plurality of rods extending perpendicular to the travel direction forming the belt, wherein a spacing distance is provided between each of the plurality of rods, and a bin system configured to receive the produce from the plurality of conveyers and package the produce into one or more bins.

The harvester may further include a spray bar positioned over the parallel bar lift conveyer. The spray bar may include one or more apertures through which a wash solution is sprayed onto passing produce that is being transported by the parallel bar lift conveyer. The plurality of conveyers may include a trash reduction zone and an air knife positioned over the trash reduction zone, wherein the air knife includes one or more apertures that spray a gas at the produce being transported by the trash reduction zone blowing trash particulate off the produce onto a trash conveyer. The harvester may further include a roller bar including one or more fingers extending radially outward from the roller bar configured to receive produce from the fluid knife system, wherein the roller bar is adjacent to the fluid knife system and is parallel to ground and perpendicular to the travel direction and rotates on its axis turning the one or more fingers at the front end lifting the produce cut by the fluid knife system.

According to an embodiment, a harvester may include a fluid knife system configured at a front end of the harvester in a travel direction of the harvester, wherein the fluid knife system projects a fluid using one or more apertures at a pressure and a direction that cuts produce, a plurality of conveyers that receive the produce and are configured to transport the produce through the harvester, the plurality of conveyers including a spray bar positioned over at least one of the plurality of conveyers, the spray bar including one or more apertures through which a wash solution is sprayed onto passing produce that is being transported by the at least one conveyer, and a bin system configured to receive the produce from the plurality of conveyers and package the produce into one or more bins.

The plurality of conveyers may include a parallel bar lift conveyer that includes a first rotating portion located toward the front end along the travel direction of the harvester, a second rotating portion behind and elevated along the travel direction in relation to the first rotating portion, and a belt that extends around the first rotating portion and the second rotating portion, the belt formed of a plurality of rods extending perpendicular to the travel direction forming the belt, wherein a spacing distance is provided between each of the plurality of rods. The plurality of conveyers may include a trash reduction zone and an air knife positioned over the trash reduction zone, wherein the air knife includes one or more apertures that spray a gas at the produce being transported by the trash reduction zone blowing trash particulate off the produce onto a trash conveyer. The harvester may further include a roller bar including one or more fingers extending radially outward from the roller bar configured to receive produce from the fluid knife system, wherein the roller bar is adjacent to the fluid knife system and is parallel to ground and perpendicular to the travel direction and rotates on its axis turning the one or more fingers at the front end lifting the produce cut by the fluid knife system.

According to an embodiment, a harvester may include a fluid knife system configured at a front end of the harvester in a travel direction of the harvester, wherein the fluid knife system projects a fluid using one or more apertures at a pressure and a direction that cuts produce, a plurality of conveyers that receive the produce and are configured to transport the produce through the harvester, the plurality of conveyers including a trash reduction zone and an air knife positioned over the trash reduction zone, wherein the air knife includes one or more apertures that spray a gas at the produce being transported by the trash reduction zone blowing trash particulate off the produce onto a trash conveyer, and a bin system configured to receive the produce from the plurality of conveyers and package the produce into one or more bins.

The plurality of conveyers may include a parallel bar lift conveyer that includes a first rotating portion located toward the front end along the travel direction of the harvester, a second rotating portion behind and elevated along the travel direction in relation to the first rotating portion, and a belt that extends around the first rotating portion and the second rotating portion, the belt formed of a plurality of rods extending perpendicular to the travel direction forming the belt, wherein a spacing distance is provided between each of the plurality of rods. The harvester may further include a roller bar including one or more fingers extending radially outward from the roller bar configured to receive produce from the fluid knife system, wherein the roller bar is adjacent to the fluid knife system and is parallel to ground and perpendicular to the travel direction and rotates on its axis turning the one or more fingers at the front end lifting the produce cut by the fluid knife system.

According to an embodiment, a method of operating a harvester for produce may include projecting a fluid that cuts produce using a fluid knife system configured at a front end of the harvester in a travel direction of the harvester, wherein the fluid knife system projects the fluid using one or more apertures at a pressure and a direction that cuts the produce. The method also includes receiving produce from the fluid knife system at a roller bar including one or more fingers extending radially outward from the roller bar, rotating the roller bar on its axis turning the one or more fingers at the front end lifting the produce cut by the fluid knife system back into the harvester, wherein the roller bar is adjacent to the fluid knife system and is parallel to ground and perpendicular to the travel direction, receiving the produce at a plurality of conveyers from the roller bar and transporting the produce using the plurality of conveyers through the harvester, and receiving the produce at a bin system from the plurality of conveyers and packaging the produce into one or more bins using the bin system.

According to an embodiment, a method of operating a harvester for produce may be provided. The method includes projecting a fluid that cuts produce using a fluid knife system configured at a front end of the harvester in a travel direction of the harvester, wherein the fluid knife system projects the fluid using one or more apertures at a pressure and a direction that cuts the produce. The method also includes receiving the produce at a plurality of conveyers, transporting the produce using the plurality of conveyers through the harvester using at least a parallel bar lift conveyer that includes a first rotating portion located toward the front end along the travel direction of the harvester, a second rotating portion behind and elevated along the travel direction in relation to the first rotating portion, and a belt that extends around the first rotating portion and the second rotating portion, the belt formed of a plurality of rods extending perpendicular to the travel direction forming the belt, wherein a spacing distance is provided between each of the plurality of rods, receiving the produce at a bin system from the plurality of conveyers, and packaging the produce into one or more bins using the bin system.

According to an embodiment, a method of operating a harvester for produce may be provided. The method includes projecting a fluid that cuts produce using a fluid knife system configured at a front end of the harvester in a travel direction of the harvester, wherein the fluid knife system projects the fluid using one or more apertures at a pressure and a direction that cuts the produce, receiving the produce at a plurality of conveyers. The method also includes transporting the produce using the plurality of conveyers through the harvester, spraying the produce with a wash solution using a spray bar while the produce is being transported using the plurality of conveyers, receiving the produce at a bin system from the plurality of conveyers, and packaging the produce into one or more bins using the bin system.

According to an embodiment, a method of operating a harvester for produce may be provided. The method includes projecting a fluid that cuts produce using a fluid knife system configured at a front end of the harvester in a travel direction of the harvester, wherein the fluid knife system projects the fluid using one or more apertures at a pressure and a direction that cuts the produce, receiving the produce at a plurality of conveyers. The method also includes transporting the produce using the plurality of conveyers through the harvester, spraying a gas at the produce being transported by a trash reduction zone of the plurality of conveyers that blows trash particulate off the produce onto a trash conveyer, receiving the produce at a bin system from the plurality of conveyers, and packaging the produce into one or more bins using the bin system.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A harvester for produce, comprising:
   a fluid knife system configured at a front end of the harvester in a travel direction of the harvester, wherein the fluid knife system comprises at least one aperture and is configured to project a fluid using the at least one aperture at a pressure and a direction that cuts the produce;
   a roller bar comprising at least one finger extending radially outward from the roller bar configured to receive the produce from the fluid knife system, wherein:
      the roller bar is adjacent to the fluid knife system, is parallel to ground and perpendicular to the travel direction and is configured to rotate on an axis of the roller bar, turning the at least one finger at the front end lifting the produce cut by the fluid knife system;
      the at least one finger is provided in a plurality of finger groups that are spaced apart along the roller bar; and
      the at least one finger is offset from the at least one aperture of the fluid knife system in the travel direction of the harvester;
   a plurality of conveyers configured to receive the produce from the roller bar and configured to transport the produce through the harvester; and
   a bin system configured to receive the produce from the plurality of conveyers and package the produce into at least one bin.

2. The harvester of claim 1, wherein the fluid knife system further comprises:
   a liquid source configured to provide a flow of the fluid to the at least one aperture; and
   a liquid pump configured to provide the fluid from the liquid source at a pressure at the at least one aperture.

3. The harvester of claim 1, wherein:
   the roller bar comprises a plurality of rods connected between two circular plates along a circumference of the two circular plates, forming a cylinder shape; and
   the at least one fingers is distributed among the plurality of rods.

4. The harvester of claim 1, wherein:
   the plurality of finger groups are spaced apart at equal intervals along the roller bar; and
   the equal intervals space apart the at least one finger offset from the at least one aperture of the fluid knife system in the travel direction of the harvester.

5. The harvester of claim 1, wherein the plurality of conveyers comprises:
   a feed conveyer configured to receive the produce from the roller bar and transport the produce along the travel direction;
   a lift conveyer configured to receive the produce from the feed conveyer and transport the produce along the travel direction;
   a trash reduction zone configured to receive the produce from the lift conveyer and transport the produce along the travel direction;
   an inspection conveyer configured to receive the produce from the trash reduction zone and transport the produce perpendicular to the travel direction outward to either side of the harvester; and
   a trash conveyer configured to receive trash from the trash reduction zone and the inspection conveyer and transport the trash off the harvester.

6. The harvester of claim 5, wherein the plurality of conveyers further comprises an air knife positioned over the trash reduction zone, wherein the air knife comprises at least one aperture configured to spray a gas at the produce transported by the trash reduction zone, blowing trash particulate off the produce onto the trash conveyer.

7. The harvester of claim 1, wherein the plurality of conveyers comprises a subset of conveyers configured to extend and rotate in a direction perpendicular to the travel direction of the harvester.

8. The harvester of claim 5, wherein the plurality of conveyers further comprises a front-end spray bar comprising at least one aperture configured to spray a wash solution onto the produce transported by the lift conveyer.

9. The harvester of claim 5, wherein the lift conveyer is a parallel bar lift conveyer that comprises:
   a first rotating portion located toward the front end along the travel direction of the harvester,
   a second rotating portion behind and elevated along the travel direction in relation to the first rotating portion, and
   a belt that extends around the first rotating portion and the second rotating portion, the belt formed of a plurality of rods extending perpendicular to the travel direction forming the belt, wherein a spacing distance is provided between each of the plurality of rods.

10. A harvester for produce, comprising:
    a fluid knife system configured at a front end of the harvester in a travel direction of the harvester, wherein the fluid knife system is configured to project a fluid using at least one aperture of the fluid knife system at a pressure and a direction that cuts the produce;
    a plurality of conveyers configured to receive the produce and transport the produce through the harvester; and
    a bin system configured to receive the produce from the plurality of conveyers and package the produce into at least one bin, wherein the bin system comprises:
       a plurality of bins that includes the at least one bin configured to carry the produce;
       an empty tote conveyer configured to transport empty bins from the plurality of bins onto the harvester toward the plurality of conveyers;
       a pack station where the produce is moved from the plurality of conveyers into at least one bin that is empty from the plurality of bins filling the at least one bin; and
       a full tote conveyer configured to receive the at least one filled bin and transport the filled bin of the plurality of bins off the harvester.

11. A harvester comprising:
    a fluid knife system configured at a front end of the harvester in a travel direction of the harvester, wherein the fluid knife system is configured to project a fluid using at least one aperture of the fluid knife system at a pressure and a direction that cuts produce;
    a plurality of conveyers configured to receive the produce and configured to transport the produce through the harvester, wherein the plurality of conveyers comprises a parallel bar lift conveyer that comprises:
  a first rotating portion located toward the front end along the travel direction of the harvester;
  a second rotating portion behind and elevated along the travel direction in relation to the first rotating portion; and
  a belt that extends around the first rotating portion and the second rotating portion, the belt formed of a plurality of rods extending perpendicular to the travel direction forming the belt, wherein a spacing distance is provided between each of the plurality of rods;
a spray bar positioned over the parallel bar lift conveyer; and
a bin system configured to receive the produce from the plurality of conveyers and package the produce into at least one bin.

12. The harvester of claim 11, wherein the spray bar comprises at least one aperture configured to spray a wash solution onto the produce transported by the parallel bar lift conveyer.

13. The harvester of claim 11, wherein the plurality of conveyers further comprises:
  a trash reduction zone; and
  an air knife positioned over the trash reduction zone, wherein the air knife comprises at least one apertures configured to spray a gas at the produce transported by the trash reduction zone, thereby blowing trash particulate off the produce onto a trash conveyer.

14. The harvester of claim 11, further comprising a roller bar comprising at least one finger extending radially outward from the roller bar configured to receive the produce from the fluid knife system, wherein the roller bar is adjacent to the fluid knife system, is parallel to ground and perpendicular to the travel direction, and is configured to rotate on an axis of the roller bar, turning the at least one finger at the front end lifting the produce cut by the fluid knife system.

15. A harvester comprising:
  a fluid knife system configured at a front end of the harvester in a travel direction of the harvester, wherein the fluid knife system is configured to project a fluid using at least one aperture of the fluid knife system at a pressure and a direction that cuts produce;
  a plurality of conveyers configured to receive the produce and configured to transport the produce through the harvester;
  a roller bar comprising at least one finger extending radially outward from the roller bar configured to receive the produce from the fluid knife system, wherein the roller bar:
    is adjacent to the fluid knife system;
    is parallel to ground and perpendicular to the travel direction;
    is configured to rotate on an axis of the roller bar, turning the at least one finger at the front end lifting the produce cut by the fluid knife system; and
    comprises a first plurality of rods connected between two circular plates along a circumference of the two circular plates, forming a cylinder shape, wherein the at least one finger is distributed among the first plurality of rods; and
  a bin system configured to receive the produce from the plurality of conveyers and package the produce into at least one bin.

16. The harvester of claim 15, wherein the plurality of conveyers comprises a spray bar positioned over at least one of the plurality of conveyers, the spray bar comprising at least one aperture configured to spray a wash solution onto the produce transported by the at least one of the plurality of conveyers.

17. The harvester of claim 15, wherein the plurality of conveyers comprises:
  a trash reduction zone; and
  an air knife positioned over the trash reduction zone, wherein the air knife comprises at least one aperture configured to spray a gas at the produce transported by the trash reduction zone, blowing trash particulate off the produce onto a trash conveyer.

18. The harvester of claim 15, wherein the plurality of conveyers comprises a parallel bar lift conveyer that comprises:
  a first rotating portion located toward the front end along the travel direction of the harvester;
  a second rotating portion behind and elevated along the travel direction in relation to the first rotating portion; and
  a belt that extends around the first rotating portion and the second rotating portion, the belt formed of a second plurality of rods extending perpendicular to the travel direction forming the belt, wherein a spacing distance is provided between each of the second plurality of rods.

19. A harvester comprising:
  a fluid knife system configured at a front end of the harvester in a travel direction of the harvester, wherein the fluid knife system is configured to project a fluid using at least one aperture of the fluid knife system at a pressure and a direction that cuts produce;
  a plurality of conveyers configured to receive the produce and configured to transport the produce through the harvester, the plurality of conveyers comprising:
    a feed conveyer configured to receive the produce and transport the produce along the travel direction;
    a lift conveyer configured to receive the produce from the feed conveyer and transport the produce along the travel direction;
    a trash reduction zone configured to receive the produce from the lift conveyer and transport the produce along the travel direction;
    an inspection conveyer configured to receive the produce from the trash reduction zone and transport the produce perpendicular to the travel direction outward to either side of the harvester; and
    a trash conveyer configured to receive trash from the trash reduction zone and the inspection conveyer and transport the trash off the harvester; and
  a bin system configured to receive the produce from the plurality of conveyers and package the produce into at least one bin.

20. The harvester of claim 19, wherein the plurality of conveyers further comprises a parallel bar lift conveyer that comprises:
  a first rotating portion located toward the front end along the travel direction of the harvester;
  a second rotating portion behind and elevated along the travel direction in relation to the first rotating portion; and
  a belt that extends around the first rotating portion and the second rotating portion, the belt formed of a plurality of rods extending perpendicular to the travel direction forming the belt, wherein a spacing distance is provided between each of the plurality of rods.

21. The harvester of claim 19, further comprising a roller bar comprising at least one finger extending radially outward from the roller bar configured to receive the produce from the fluid knife system, wherein the roller bar is adjacent to the fluid knife system, is parallel to ground and perpendicular to the travel direction, and is configured to rotate on an axis of the roller bar, turning the at least one finger at the front end lifting the produce cut by the fluid knife system.

22. The harvester of claim 21, wherein:
  the roller bar further comprises a plurality of rods connected between two circular plates along a circumference of the two circular plates, forming a cylinder shape; and
  the at least one finger is distributed among the plurality of rods.

23. The harvester of claim 19, further comprising an air knife positioned over the trash reduction zone, wherein the air knife comprises at least one aperture configured to spray a gas at the produce being transported by the trash reduction zone, thereby blowing trash particulate off the produce onto the trash conveyer.

* * * * *